(12) United States Patent
Hu et al.

(10) Patent No.: US 8,511,881 B2
(45) Date of Patent: Aug. 20, 2013

(54) LIGHT GUIDE PLATE AND BACKLIGHT MODULE HAVING HIGH LIGHT UTILIZATION EFFICIENCY BY REDUCING LIGHT LOSS

(75) Inventors: Chia-Chuang Hu, Hsin-Chu (TW); Ming-Dah Liu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 13/602,341

(22) Filed: Sep. 4, 2012

(65) Prior Publication Data

US 2013/0058130 A1    Mar. 7, 2013

(30) Foreign Application Priority Data

Sep. 6, 2011    (TW) ............................. 100132131 A

(51) Int. Cl.
*F21V 8/00* (2006.01)
*F21V 11/00* (2006.01)

(52) U.S. Cl.
USPC ............ 362/613; 362/625; 362/606; 362/355

(58) Field of Classification Search
CPC .................... F21V 19/001; F21V 5/02; G02F 2001/133607; G02F 2001/133611
USPC ................ 362/615, 606, 627, 619; 359/298, 359/489.07; 349/62, 65, 67; 445/24
See application file for complete search history.

(56) References Cited

U.S. PATENT DOCUMENTS

| | | | |
|---|---|---|---|
| 6,712,481 B2 | 3/2004 | Parker et al. | |
| 7,252,424 B2 | 8/2007 | Hsu et al. | |
| 7,334,934 B2 | 2/2008 | Feng et al. | |
| 2006/0104089 A1 | 5/2006 | Feng et al. | |
| 2007/0047258 A1 | 3/2007 | Yao et al. | |
| 2010/0104089 A1 | 4/2010 | Hauptmann et al. | |

FOREIGN PATENT DOCUMENTS

| | | |
|---|---|---|
| CN | 1773345 | 5/2006 |
| CN | 100370329 | 2/2008 |
| TW | M264504 | 5/2005 |
| TW | I246576 | 1/2006 |
| TW | I321250 | 3/2010 |
| TW | I331695 | 10/2010 |

*Primary Examiner* — Tracie Y Green
(74) *Attorney, Agent, or Firm* — Jianq Chyun IP Office

(57) ABSTRACT

A light guide plate includes a light emitting surface, a bottom surface, a light incident surface and many optical units. Each of the optical units includes a first optical microstructure and a second optical microstructure. The second optical microstructure has a first surface and a second surface. A first cross-sectional line obtained by cutting the first surface along a direction perpendicular to the light incident surface and the light emitting surface is an inclined straight line. A first end of a second cross-sectional line obtained by cutting the second surface along the direction perpendicular to the light incident surface and the light emitting surface and a second end of the second cross-sectional line are connected to form a reference straight line. An acute angle included by the reference straight line and a normal line of the light emitting surface is α. The acute angle α satisfies an equation:

$$\frac{\left[90°+\sin^{-1}\left(\frac{\sin\psi}{n}\right)\right]}{2}-15°\leq\alpha\leq\frac{\left[90°+\sin^{-1}\left(\frac{\sin\psi}{n}\right)\right]}{2}+15°$$

43 Claims, 21 Drawing Sheets

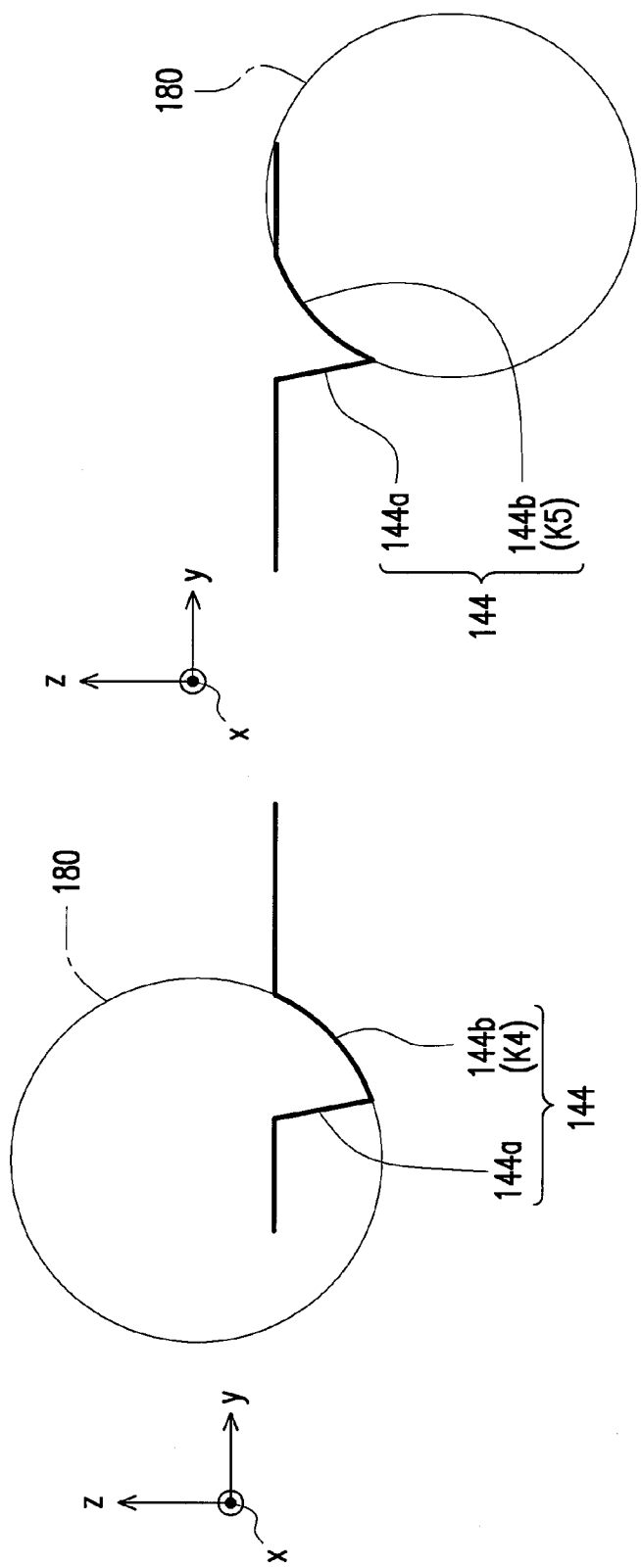

LIGHT GUIDE PLATE AND BACKLIGHT MODULE HAVING HIGH LIGHT UTILIZATION EFFICIENCY BY REDUCING LIGHT LOSS

CROSS-REFERENCE TO RELATED APPLICATION

This application claims the priority benefit of Taiwan application serial no. 100132131, filed on Sep. 6, 2011. The entirety of the above-mentioned patent application is hereby incorporated by reference herein and made a part of this specification.

BACKGROUND OF THE INVENTION

1. Field of the Invention

The invention generally relates to an optical element and a light source, in particular, to a light guide plate and a backlight module.

2. Description of Related Art

A light guide plate in a conventional backlight module has a plurality of optical microstructures. The optical microstructures may make total reflection of a light beam travelling in the light guide plate fail, so that the light beam can be transmitted to a light emitting surface of the light guide plate, and exits from the light emitting surface of the light guide plate. However, the conventional optical microstructure can only guide the light beam to the light emitting surface of the light guide plate, but cannot enable the light beam to exit in a desired angle. Generally speaking, in order to modify a travelling direction of the light beam that exits from the light emitting surface of the light guide plate, the conventional light guide plate is equipped with a plurality of optical films to enable the light beam to exit in a desired angle. In this way, not only a material cost of the backlight module is increased, but also an energy loss of the light beam is incurred when the light beam is reflected or refracted between the optical films, thereby causing light utilization efficiency of the backlight module to decrease.

Taiwan Patent No. I331695 discloses a light guide plate, and the light guide plate includes a plate body, a plurality of microstructures, and a plurality of protruding structures. Taiwan Patent No. M264504 discloses a microstructure, and the microstructure is in the form of a water drop, and is distributed on a lower end surface of a light guide plate in a protruding manner. U.S. Pat. No. 7,334,934, China Patent No. 100370329, U.S. Patent Publication No. 20060104089, and U.S. Pat. No. 7,252,424 all disclose a light guide plate, and a reflective surface of the light guide plate has a microstructure. Taiwan Patent No. I321250 discloses a light guide plate, and the light guide plate includes a light transmissive substrate, a first microstructure, and a second microstructure. Taiwan Patent No. I246576 and U.S. Pat. No. 6,712,481 disclose a light-emitting panel assembly including a light-emitting panel member, in which individual light extracting deformities of well defined shapes of patterns in or on one or more panel surfaces are used to produce a desired light output distribution through the panel member, at least some of the deformities have inclined surfaces for reflecting or refracting light striking the inclined surfaces which leaves the panel member in a desired angle distribution and have a curved surface curved transversely in a width direction of the deformities for reflecting or refracting additional light striking the curved surface, so as to distribute the light across the panel member to provide a more uniform distribution of the light emitted by the panel member.

SUMMARY OF THE INVENTION

The invention provides a light guide plate, which can reduce light loss.

The invention provides a backlight module, which has a high light utilization efficiency.

Other objectives and advantages of the invention may further be known from the technical features disclosed by the invention.

In order to achieve one or part of or all of the objectives or other objectives, an embodiment of the invention provides a light guide plate which includes a light emitting surface, a bottom surface, at least one light incident surface, and a plurality of optical units. The bottom surface is opposite to the light emitting surface. The light incident surface connects the light emitting surface and the bottom surface. The plurality of optical units is disposed on the bottom surface. Each of the optical units includes a first optical microstructure and at least one second optical microstructure. The second optical microstructure is adjacent to the first optical microstructure. The first optical microstructure is disposed between the light incident surface and the second optical microstructure. Each second optical microstructure has a first surface and a second surface. The first surface inclines towards a side of the light incident surface. A first cross-sectional line obtained by cutting the first surface along a direction perpendicular to the light incident surface and the light emitting surface is substantially a first inclined straight line. The second surface is connected to the first surface and inclines away from the side of the light incident surface. A first end, adjacent to the bottom surface, of a second cross-sectional line obtained by cutting the second surface along the direction perpendicular to the light incident surface and the light emitting surface and a second end, away from the bottom surface, of the second cross-sectional line are connected to form a first reference straight line. An acute angle included by the first reference straight line and a normal line of the light emitting surface is α. The acute angle α satisfies an equation below:

$$\frac{\left[90° + \sin^{-1}\left(\frac{\sin\psi}{n}\right)\right]}{2} - 15° \leq \alpha \leq \frac{\left[90° + \sin^{-1}\left(\frac{\sin\psi}{n}\right)\right]}{2} + 15°$$

where ψ is a desired angle included by an exiting light beam from the light guide plate and the normal line of the light emitting surface, n is an index of refraction of the light guide plate, and the first surface of the second optical microstructure is between the first optical microstructure and the second surface of the second optical microstructure.

Another embodiment of the invention provides a backlight module, which includes the above-mentioned light guide plate and at least one light-emitting element. The light-emitting element is disposed beside the light incident surface and is capable of emitting a light beam. The light beam enters the light guide plate through the light incident surface, and is transmitted out of the light guide plate from the light emitting surface.

In view of the above, the light guide plate and the backlight module according to the embodiments of the invention at least have one of the following advantages. In the light guide plate and the backlight module according to the embodiments of the invention, the second optical microstructure of the optical unit can re-guide a light beam running out of the light guide plate from the first optical microstructure of the optical unit into the light guide plate, so that the light beam can be re-used by the backlight module, thereby increasing light utilization efficiency of the light guide plate and the backlight module according to the embodiments of the invention. In addition, the second optical microstructure according to the embodiments of the invention can further reflect the light beam running out of the light guide plate from the first optical microstructure to the light emitting surface, so as to enable the light beam to exit in a desired light exiting angle. In this way, the backlight module according to the embodiments of the invention may directly be used as an backlight source without being equipped with any optical film.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A and FIG. 4B are schematic sectional views of a second optical microstructure according to the first embodiment of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
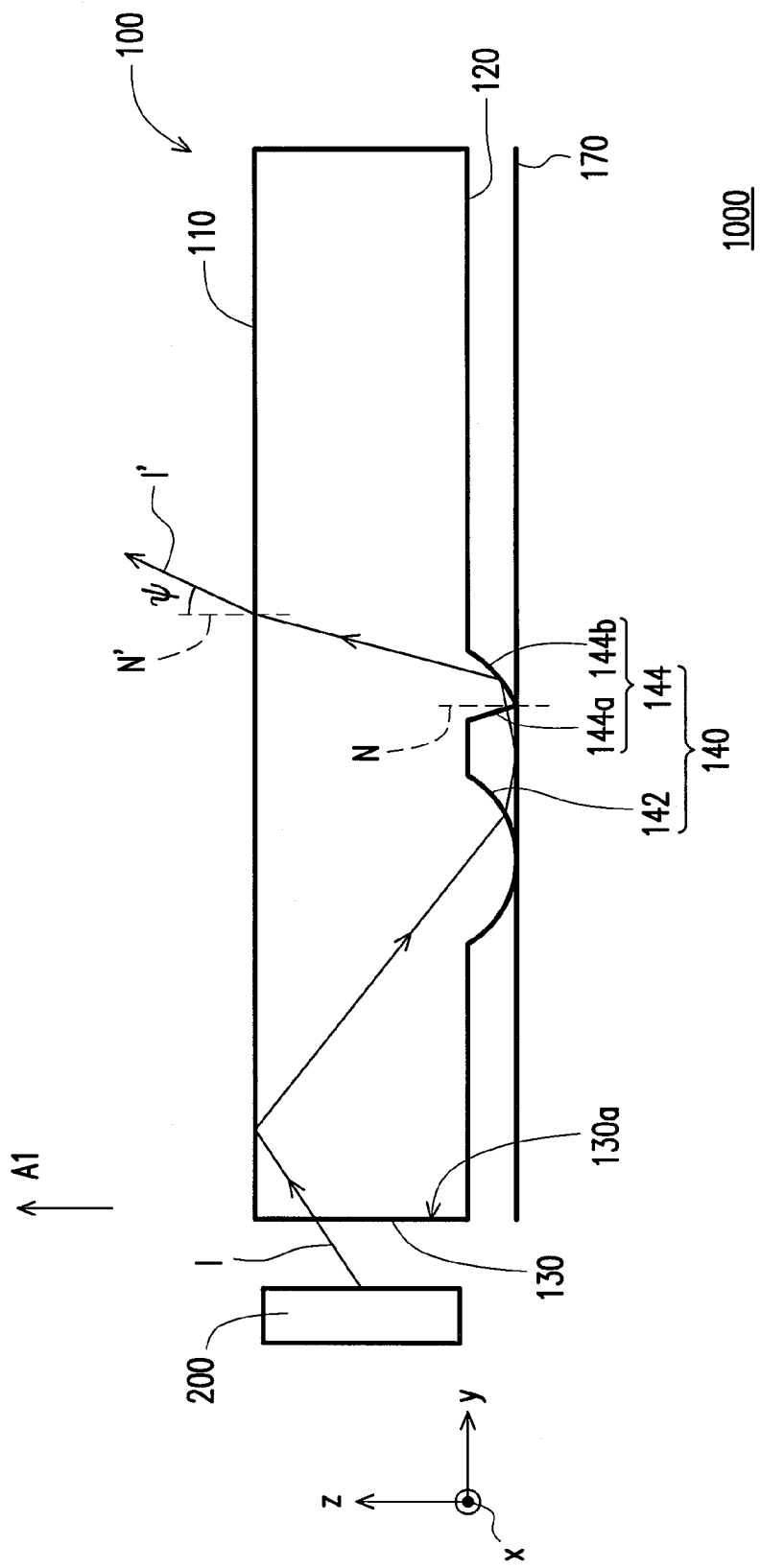
FIG. 1 is a schematic sectional view of a backlight module according to a first embodiment of the invention.

FIG. 1 is a schematic sectional view of a backlight module according to a first embodiment of the invention. Referring to FIG. 1, a backlight module 1000 of this embodiment includes a light guide plate 100 and at least one light-emitting element 200. The light guide plate 100 of this embodiment includes a light emitting surface 110 (for example, a plane parallel to an xy plane), a bottom surface 120 (for example, the xy plane) opposite to the light emitting surface 110, a light incident surface 130 (for example, a plane parallel to an xz plane) connecting the light emitting surface 110 and the bottom surface 120, and a plurality of optical units 140 disposed on the bottom surface 120 (only one optical unit 140 is exemplarily illustrated in FIG. 1, and is used as a representative). The backlight module 1000 of this embodiment may further include a reflective sheet 170. The bottom surface 120 is between the reflective sheet 170 and the light emitting surface 110. The reflective sheet 170 can reflect a light beam leaking from the bottom surface 120 of the light guide plate 100 back into the light guide plate 100.

The light-emitting element 200 of this embodiment is disposed beside the light incident surface 130, and is capable of emitting a light beam 1. The light beam 1 enters the light guide plate 100 through the light incident surface 130, and is transmitted out of the light guide plate 100 from the light emitting surface 110, so as to form a light beam 1'. The light-emitting element 200 of this embodiment may be a light-emitting diode (LED), a cold cathode ray tube (CCFL), or other suitable light-emitting elements, but the invention is not limited thereto. In addition, the optical unit 140 of this embodiment is a structure protruding relative to the bottom surface 120.

In this embodiment, the optical unit 140 includes a first optical microstructure 142 and at least one second optical microstructure 144. The first optical microstructure 142 of this embodiment may be any structure that can make total reflection of the light beam 1 in the light guide plate 100 fail. The light beam 1 may exit from the light emitting surface 110 after being reflected by the first optical microstructure 142. However, a part of the light beam 1 transmitted to the first optical microstructure 142 runs out of the light guide plate 100 from the first optical microstructure 142, thereby decreasing light utilization efficiency of the backlight module 1000. In this case, the second optical microstructure 144 adjacent to the first optical microstructure 142 can guide the light beam 1 that exits from the first optical microstructure 142 into the light guide plate 100, so as to enable the light beam 1 to be re-used by the backlight module 1000, thereby increasing the light utilization efficiency of the backlight module 1000. The second optical microstructure 144 of this embodiment can reflect the light beam 1 to enable the light beam 1 to be transmitted out of the light guide plate 100 from the light emitting surface 110 to form the light beam 1' in a desired light exiting angle ψ.

Figure 2:
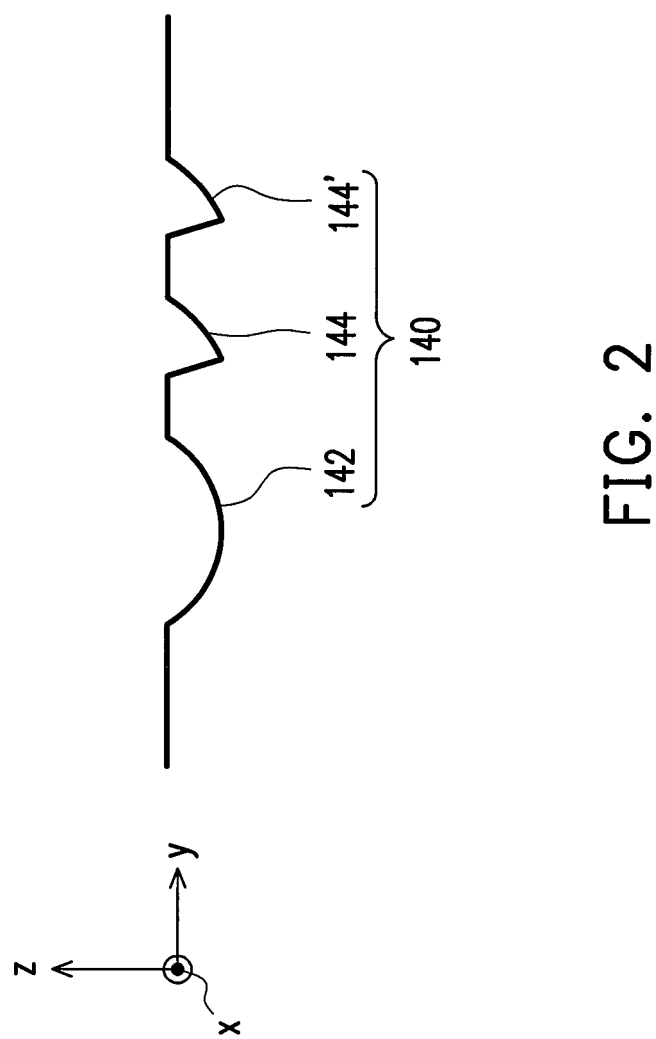
FIG. 2 is a schematic sectional view of an optical unit according to the first embodiment of the invention.

A mechanism through which the second optical microstructure 144 of this embodiment can guide the light beam 1 into the light guide plate 100 and enable the light beam 1' to exit from the light emitting surface 110 in the desired light exiting angle ψ is illustrated below in detail with reference to accompanying drawings. Referring to FIG. 1, the optical unit 140 of this embodiment includes the first optical microstructure 142 and the at least one second optical microstructure 144. Only one second optical microstructure 144 is exemplarily illustrated in the optical unit 140 shown in FIG. 1, and is used as a representative, but the invention is not limited to FIG. 1. As shown in FIG. 2, in other embodiments, the optical unit 140 may include a plurality of second optical microstructures 144 and 144', a function of the second optical microstructure 144' is similar to that of the second optical microstructure 144, and the second optical microstructure 144' can re-guide the light beam 1 running out of the light guide plate 100 from the second optical microstructure 144 into the light guide plate 100.

Figure 3:
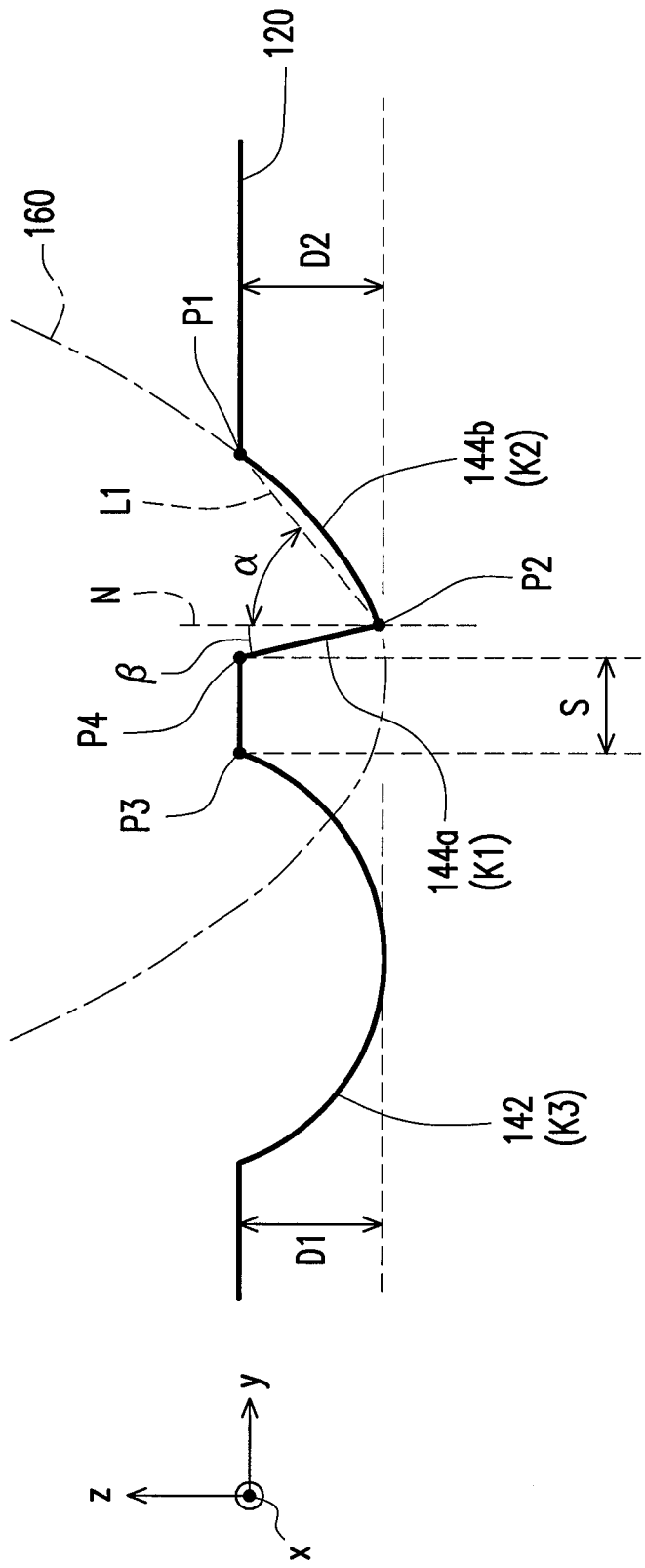
FIG. 3 is a partially enlarged view of a light guide plate shown in FIG. 1.

FIG. 3 is a partially enlarged view of the light guide plate 100 shown in FIG. 1. Referring to FIG. 1 and FIG. 3, in this embodiment, the first optical microstructure 142 is disposed between the light incident surface 130 and the second optical microstructure 144, and each second optical microstructure 144 has a first surface 144a and a second surface 144b connected to the first surface 144a (as shown in FIG. 1). In this embodiment, the first surface 144a of the second optical microstructure 144 inclines towards a side 130a of the light incident surface 130 (as shown in FIG. 1). A cross-sectional line obtained by cutting the first surface 144a along a direction perpendicular to the light incident surface 130 and the light emitting surface 110 includes a cross-sectional line K1, and the cross-sectional line K1 is substantially an inclined straight line (as shown in FIG. 3). Specifically, the first surface 144a of this embodiment may substantially be an inclined plane inclining relative to the light emitting surface 110. In this embodiment, an acute angle included by the first surface 144a and a normal line N of the light emitting surface 110 is β (as shown in FIG. 3), and preferably the acute angle β is as small as possible. For example, the acute angle β may be between 0° and 25°.

Referring to FIG. 1, the light beam 1 is transmitted to the second surface 144b of the second optical microstructure 144 after the light beam 1 passing through the first surface 144a of the second optical microstructure 144. Referring to FIG. 1 and FIG. 3, the second surface 144b of the second optical microstructure 144 inclines away from the side 130a of the light incident surface 130. In this embodiment, a cross-sectional line obtained by cutting the second surface 144b along the direction perpendicular to the light incident surface 130 and the light emitting surface 110 includes a cross-sectional line K2, and the cross-sectional line K2 may be substantially a part of a parabolic curve 160 (as shown in FIG. 3). However, the invention is not limited thereto. As shown in FIG. 4A, in another embodiment, a cross-sectional line obtained by cutting the second surface 144b along the direction perpendicular to the light incident surface 130 and the light emitting surface 110 includes a cross-sectional line K4. The cross-sectional line K4 may be a circular arc of a circle 180. The circular arc may substantially be a curved line protruding away from the bottom surface 120 and inclines away from the light incident surface 130. For example, as shown in FIG. 4A and with reference to FIG. 1, the center of the circle 180 is between the side 130a of the incident surface 130 and cross-sectional line K4. As shown in FIG. 4B, in another embodiment, a cross-sectional line obtained by cutting the second surface 144b along the direction perpendicular to the light incident surface 130 and the light emitting surface 110 includes a cross-sectional line K5. The cross-sectional line K5 may also be a circular arc of the circle 180. For example, as shown in FIG. 4B and with reference to FIG. 1, the center of the circle 180 is between the side opposite to the side 130a of the incident surface 130 and cross-sectional line K5.

Referring to FIG. 1 and FIG. 3, in this embodiment, a first end P1, adjacent to the bottom surface 120, of the cross-sectional line K2 and a second end P2, away from the bottom surface 120, of the cross-sectional line K2 are connected to form a first reference straight line L1. In this embodiment, an acute angle included by the first reference straight line L1 and the normal line N of the light emitting surface 110 is α, and the acute angle α satisfies the following equation (1):

$$\frac{\left[90° + \sin^{-1}\left(\frac{\sin\psi}{n}\right)\right]}{2} - 15° \le \alpha \le \frac{\left[90° + \sin^{-1}\left(\frac{\sin\psi}{n}\right)\right]}{2} + 15° \quad (1)$$

where ψ is a desired angle included by an exiting light beam 1' and a normal line N' of the light emitting surface 110, n is an index of refraction of the light guide plate 100, and the first surface 144a of the second optical microstructure 144 is between the first optical microstructure 142 and the second surface 144b of the second optical microstructure 144. When the acute angle α satisfies the equation (1), the second surface 144b can reflect the light beam 1' running out of the light guide plate 100 from the first optical microstructure 142 to the light emitting surface 110, and enable the light beam 1' to exit in the specific angle ψ. In other words, in order to enable the light beam 1' to exit in the specific angle ψ, the structure of the second optical microstructure 144 can be obtained by using the aforementioned equation (1) without complicated simulation, thereby reducing time required for developing the backlight module 1000.

For example, in order that the angle ψ_ included by the light beam 1' and the normal line N' of the light emitting surface 110 is 30° when n=1.49, the acute angle α included by the first reference straight line L1 and the normal line N of the light emitting surface 110 may be designed to be between 39.8° and 69.8°. When the angle ψ included by the light beam 1' and the normal line N' of the light emitting surface 110 is 30°, the backlight module 1000 of this embodiment may be used as a backlight source when equipped with an optical film (for example, a brightness enhancement film or BEF). In order that the angle ψ included by the light beam 1' and the normal line N' of the light emitting surface 110 is 0° when n=1.49, the acute angle α included by the first reference straight line L1 and the normal line N of the light emitting surface 110 may be designed to be between 30° and 60°. When the angle ψ included by the light beam 1' and the normal line N' of the light emitting surface 110 is 0°, the backlight module 1000 of this embodiment may directly be used as a backlight source without being equipped with any other optical film.

In addition, as shown in FIG. 1 and FIG. 3, in this embodiment, a height D2 of the second optical microstructure 144 of the optical unit 140 in a direction A1 perpendicular to the light emitting surface 110 is smaller than or equal to a height D1 of the corresponding first optical microstructure 142 in the direction A1 perpendicular to the light emitting surface 110. Furthermore in this embodiment, a distance S between the first optical microstructure 142 of the optical unit 140 and the corresponding second optical microstructure 144 may be between 0 micrometer (μm) and 50 μm. A cross-sectional line obtained by cutting the first optical microstructure 142 along the direction perpendicular to the light incident surface 130 and the light emitting surface 110 includes a cross-sectional line K3. An end adjacent to the bottom surface 120 and away from the light incident surface 130, of the cross-sectional line K3 is an end P3. A cross-sectional line obtained by cutting the first surface 144a of the second optical microstructure 144 along the direction perpendicular to the light incident surface 130 and the light emitting surface 110 includes the cross-sectional line K1. An end adjacent to the bottom surface 120 and adjacent to the light incident surface 130, of the cross-sectional line K1 is an end P4. A distance between the end P3 and the end P4 is the distance S.

Figures 5A, 5B, 5C:
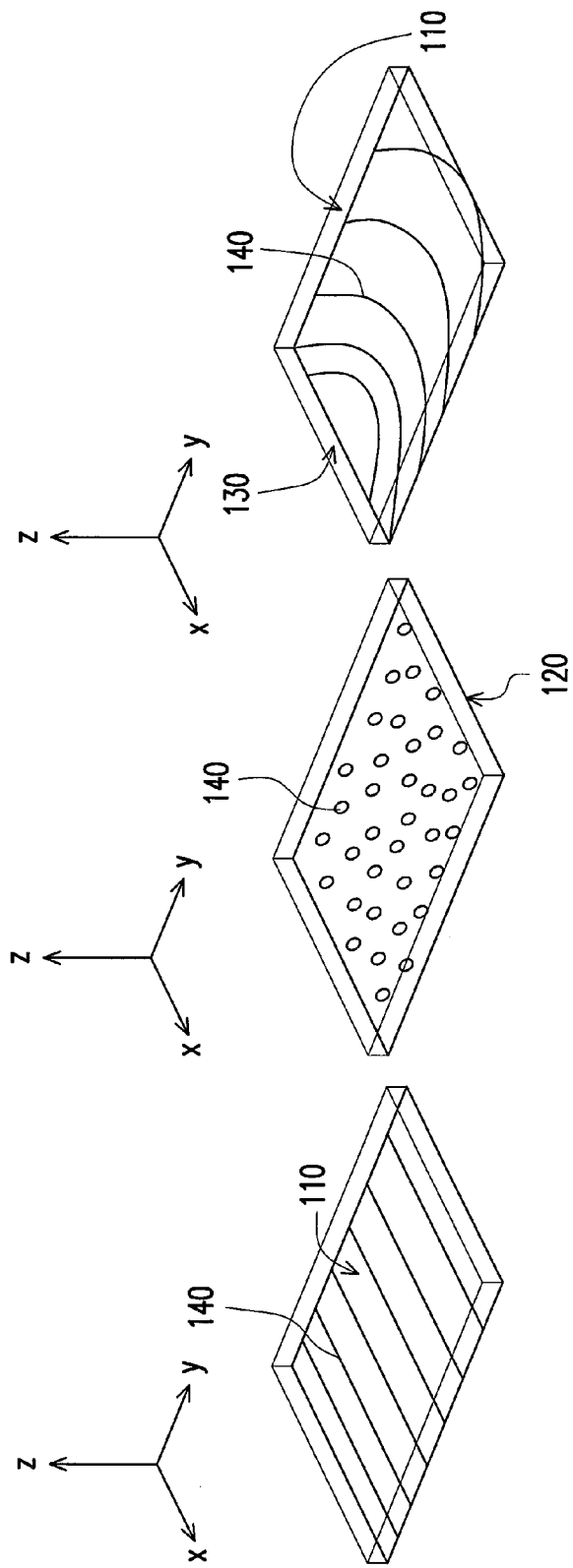
FIG. 5A, FIG. 5B, and FIG. 5C are schematic views of a light guide plate according to an embodiment of the invention.

The optical unit 140 of this embodiment may be disposed on the bottom surface 120 in a plurality of manners. For example, as shown in FIG. 5A, in this embodiment, each of the optical units 140 may be a bar-shaped rib extending along a direction substantially parallel to the light emitting surface 110. However, the invention is not limited thereto. As shown in FIG. 5B, in another embodiment, each of the optical units 140 may be a protruding point, and the protruding points may be disposed on the bottom surface 120 in a plurality of manners (e.g. randomly or in a manner of specific or predetermined pattern). As shown in FIG. 5C, in another embodiment, each of the optical units 140 may be an arc-shaped rib extending along the direction substantially parallel to the light emitting surface 110, and the concavity of the arc-shaped rib faces the light incident surface 130. In other words, the arc-shaped rib may extend outwards from the light incident surface 130 in a radial form.

Figure 6:
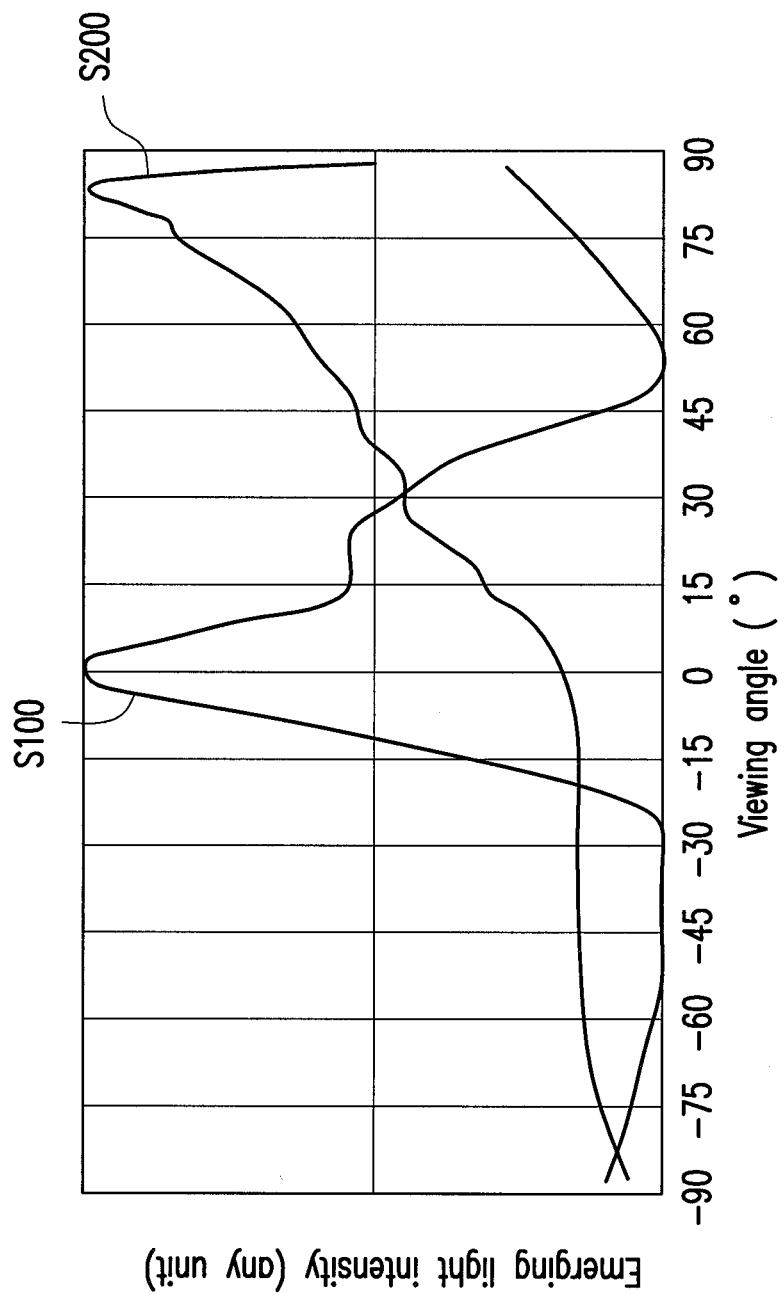
FIG. 6 illustrates exiting light intensity distributions of a backlight module according to an embodiment of the invention and a conventional backlight module in various viewing angles.

A curved line S100 in FIG. 6 illustrates an exiting light intensity distribution of the backlight module 1000 of this embodiment in which the ψ is designed to be 0° in various viewing angles. A curved line S200 in FIG. 6 illustrates an exiting light intensity distribution of a conventional backlight module in various viewing angles. By comparing the curved line S100 with the curved line S200, light produced by the backlight module 1000 of this embodiment is concentrated in a front view direction (that is, an angle included by the direction of the light and the normal line N' of the light emitting surface 110 is 0°), however the light produced by the conventional backlight module is concentrated in a direction, an angle between the light and a normal line of a light emitting surface of the conventional backlight module is about 82°. Therefore, the backlight module 1000 of this embodiment may be directly used as a backlight source without any additional optical film, which is different from the conventional backlight module that is required to be used in combination with other optical film.

Second Embodiment

Figure 7:
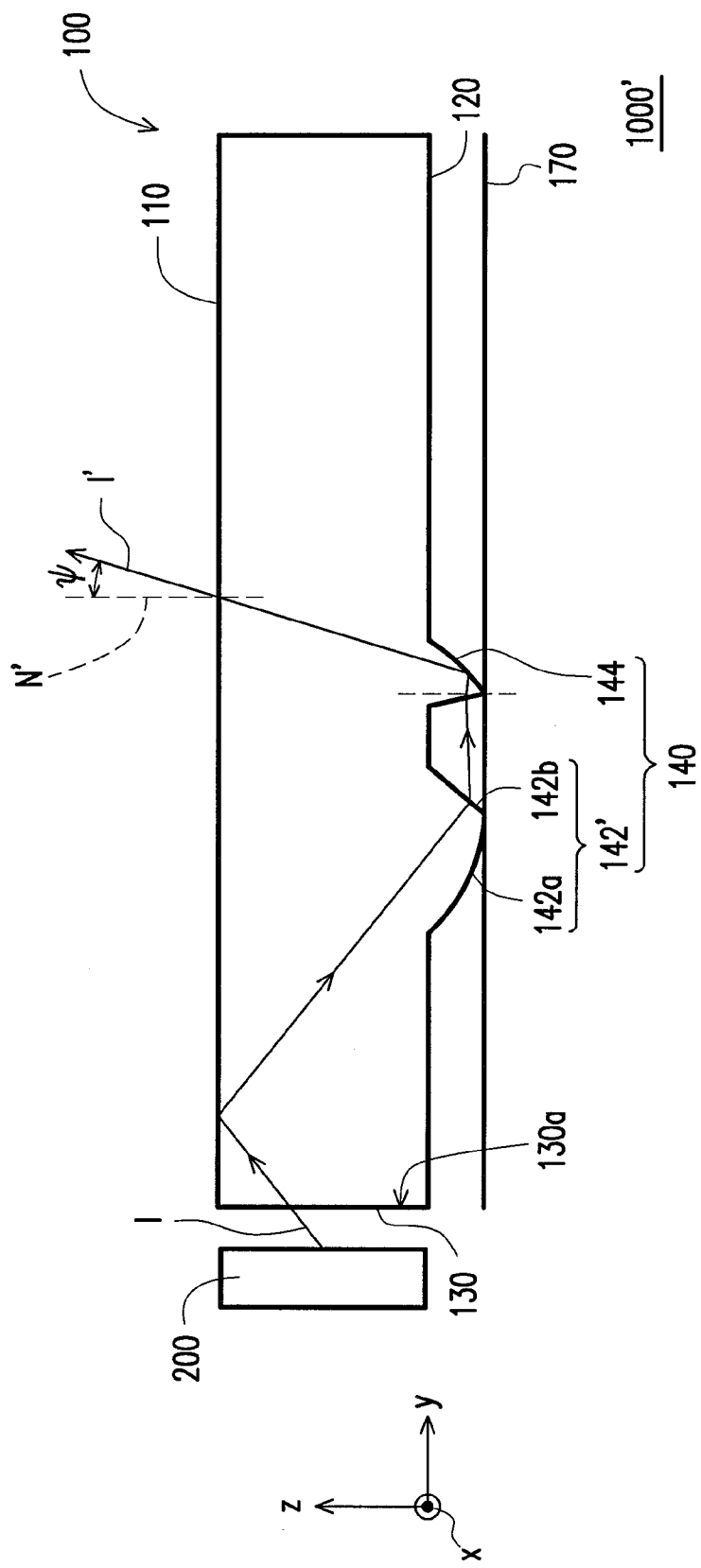
FIG. 7 is a schematic sectional view of a backlight module according to a second embodiment of the invention.

FIG. 7 is a schematic sectional view of a backlight module according to a second embodiment of the invention. Referring to FIG. 7, a backlight module 1000' of this embodiment is similar to the backlight module 1000 of the first embodiment, and a major difference between the backlight module 1000' and the backlight module 1000 is that a first optical microstructure 142' in the backlight module 1000' of this embodiment is different from the first optical microstructures 142 of the first embodiment. The difference is described below, and similarities between the backlight module 1000 and the backlight module 1000' are not repeated herein.

Figure 8:
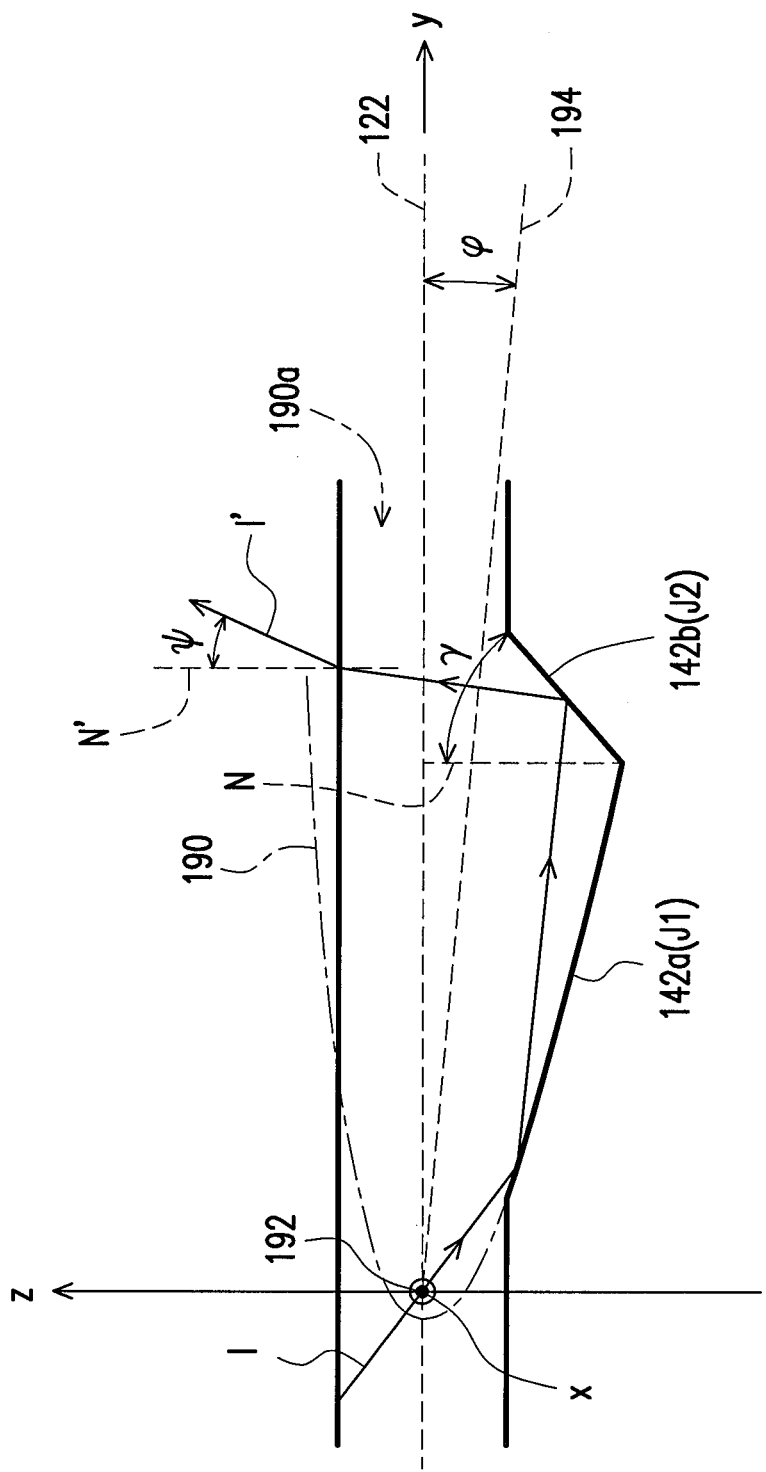
FIG. 8 is a partially enlarged view of a light guide plate shown in FIG. 7.

Referring to FIG. 7, the first optical microstructure 142' of this embodiment has a first surface 142a and a second surface 142b connected to the first surface 142a. The first surface 142a can reflect most of a light beam 1 emitted by the light-emitting element 200 to the second surface 142b. The second surface 144b can reflect the light beam 1 to the light emitting surface 110, and enable a light beam 1' to exit from the light emitting surface 110 in a desired light emergence angle ψ. FIG. 8 is a partially enlarged view of the light guide plate 100 shown in FIG. 7. A mechanism through which the first surface 142a of the first optical microstructure 142' of this embodiment can reflect most of the light beam 1 emitted by the light-emitting element 200 to the second surface 142b is illustrated below with reference to FIG. 7 and FIG. 8. Furthermore, a mechanism through which the second surface 142b can reflect the light beam 1 to the light emitting surface 110 and enable the light beam 1' to exit from the light emitting surface 110 in the desired light exiting angle ψ is illustrated.

First, the mechanism through which the first surface 142a can reflect most of the light beam 1 emitted by the light-emitting element 200 to the second surface 142b is illustrated. Referring to FIG. 7 and FIG. 8, in this embodiment, the first surface 142a of the first optical microstructure 142' inclines towards the side 130a of the light incident surface 130. A cross-sectional line obtained by cutting the first surface 142a along a direction perpendicular to the light incident surface 130 and the light emitting surface 110 includes a cross-sectional line J1. The cross-sectional line J1 is substantially a part of a parabolic curve 190. Using the character that the light beam 1 passing a focus 192 of the parabolic curve 190 and reflected by the parabolic curve 190 would be transmitted in a direction parallel to a symmetry axis 194 of the parabolic curve 190 towards an opening 190a of the parabolic curve 190, the first surface 142a can modify a travelling direction of most of the light beam 1 (including the light beam 1 not passing the focus 192 of the parabolic curve 190) into a direction substantially parallel to the symmetry axis 194 of the parabolic curve 190, so that most of the light beam 1 can be reflected by the first surface 142a, and travel in the direction substantially or almost parallel to the symmetry axis 194 of the parabolic curve 190 to arrive at the second surface 142b. In an embodiment, the direction of the symmetry axis 194 of the parabolic curve 190 is parallel to the bottom surface 120, so that most of the light beam 1 can be reflected by the first surface 142a, and travel in a direction substantially parallel to the bottom surface 120 to arrive at the second surface 142b.

Figure 9:
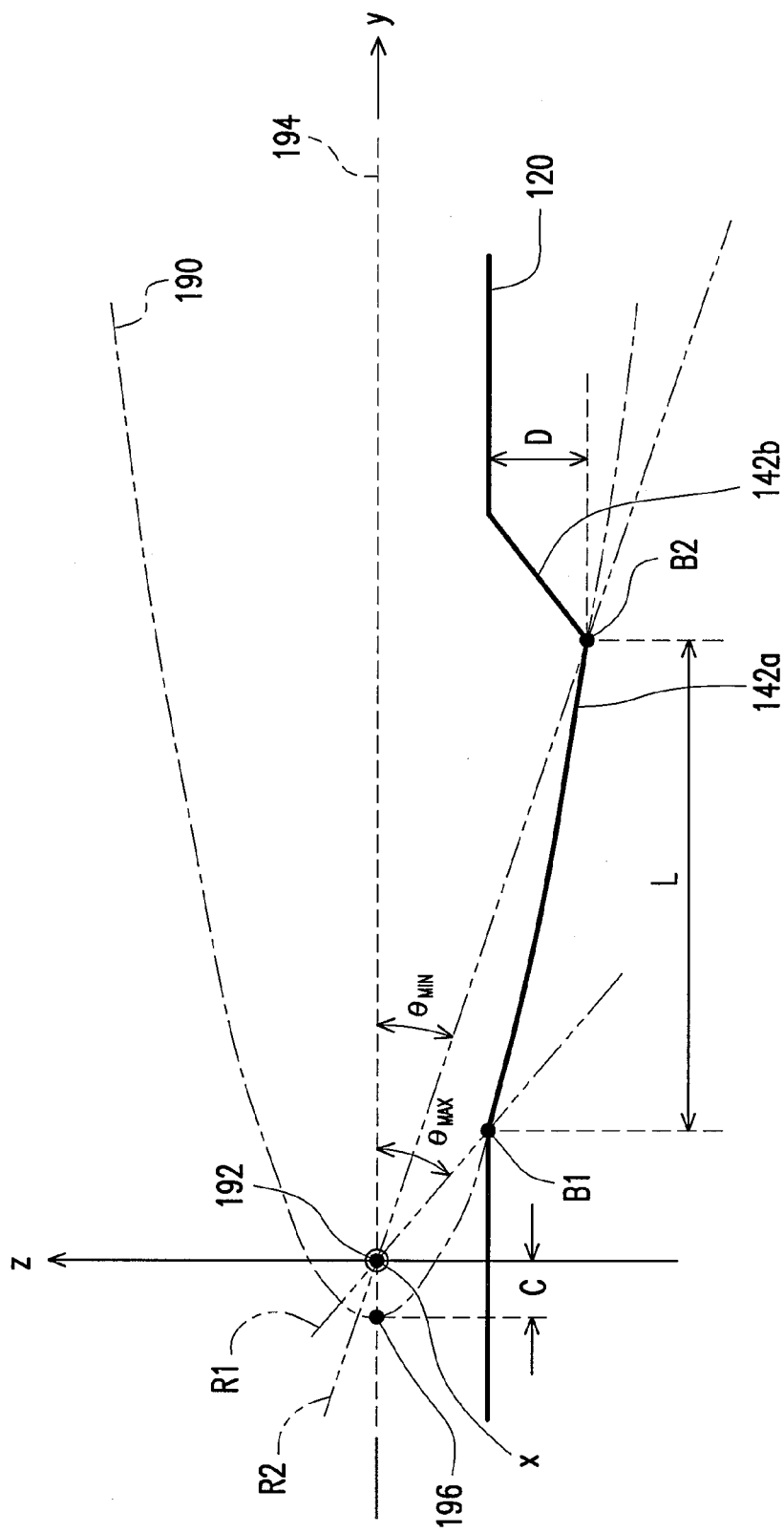
FIG. 9 illustrates a first optical microstructure according to an embodiment of the invention.

Referring to FIG. 9, more specifically the parabolic curve 190 intersects the bottom surface 120 at an end B1, and the parabolic curve 190 intersects the second surface 142b of the first optical microstructure 142' at an end B2. The end B1 and the focus 192 of the parabolic curve 190 are connected to form a reference line R1, and the end B2 and the focus 192 of the parabolic curve 190 are connected to form a reference line R2. An angle included by the reference line R1 and the symmetry axis 194 is $\theta_{MAX}$, and an angle included by the reference line R2 and the symmetry axis 194 is $\theta_{MIN}$. In this embodiment, values of the included angle $\theta_{MAX}$ and the included angle $\theta_{MIN}$ may be designed properly to obtain good efficiency of the first surface 142a reflecting the light beam 1 to the second surface 142b.

For example, in this embodiment, the included angle $\theta_{MAX}$ and the included angle $\theta_{MIN}$ may satisfy the following equations (2):

$$\theta_{MAX} \leq \sin^{-1}(1/n) + 5° - \phi$$

$$\theta_{MIN} = \theta + \phi \quad (2)$$

where in the equations θ satisfies: $0 < \theta < \theta_{MAX} - \phi$, n is an index of refraction of the light guide plate 100, and φ is an angle included by a reference plane 122 parallel to the bottom surface 120 and the symmetry axis 194 of the parabolic curve 190 (as shown in FIG. 8). When the included angle $\theta_{MAX}$ and the included angle $\theta_{MIN}$ satisfy the equations (2), the efficiency of the first surface 142a reflecting the light beam 1 to the second surface 144b is good, thereby increasing light utilization efficiency of the backlight module 1000' and the light guide plate 100 of this embodiment.

Referring to FIG. 9, in this embodiment, a distance between the end B1 and the end B2 in a direction parallel to the bottom surface 120 is L, and a distance between the end B1 and the end B2 in a direction perpendicular to the bottom surface 120 is D. In this embodiment, the distance L between the end B1 and the end B2 in the direction parallel to the bottom surface 120 may be between 0 millimeter (mm) and 2 mm, and the distance D between the end B1 and the end B2 in the direction perpendicular to the bottom surface 120 may be between 0 μm and 500 μm. However, the invention is not limited thereto. When the distance L and/or the distance D are determined, a structure of the parabolic curve 190 is determined accordingly.

Specifically, if in this embodiment the parabolic curve 190 is disposed in a yz plane, and the focus 192 of the parabolic curve 190 is disposed at an origin of yz-plane coordinates, the parabolic curve 190 may be represented by an equation (3) below $$y(z) = z^2/(4c) \quad (3)$$

where c is a distance between a vertex 196 and the focus 192 of the parabolic curve 190. When the equation (3) is modified by using polar coordinates, that is, y=r·cos θ and z=r·sin θ are adopted by the equation (3), the equation (3) can be represented by an equation (4) below:

$$r(\theta) = \frac{4c \cdot \cot\theta}{\sin\theta} \quad (4)$$

In this case, the distance D between the end B1 and the end B2 in the direction perpendicular to the bottom surface 120 and the distance L between the end B1 and the end B2 in the direction parallel to the bottom surface 120 may respectively be represented by an equation (5) and an equation (6) below in a polar coordinate manner:

$$r(\theta_{MIN}) \cdot \sin(\theta_{MIN}) - r(\theta_{MAX}) \cdot \sin(\theta_{MAX}) = D \quad (5)$$

$$r(\theta_{MIN}) \cdot \cos(\theta_{MIN}) - r(\theta_{MAX}) \cdot \cos(\theta_{MAX}) = L \quad (6)$$

When the equation (4) is adopted by the equation (5) and the equation (6), an equation (7) and an equation (8) below are obtained:

$$4c \cdot (\cot\theta_{MIN} - \cot\theta_{MAX}) = D \quad (7)$$

$$4c \cdot [(\cot\theta_{MIN})^2 - (\cot\theta_{MAX})^2] = L \quad (8).$$

According to the equation (7), in this embodiment, the structure of the parabolic curve 190 (the distance c between the vertex 196 and the focus 192 of the parabolic curve 190) may be determined as the distance D is determined. For example, when the distance D=10 μm, n=1.49, $\theta_{MAX}$=47.155°, and $\theta_{MIN}$=15°, according to the equation (8), c=0.891 μm, and in this case the distance L=46.595 μm. However, the invention is not limited thereto. According to the equation (8), the structure of the parabolic curve 190 (the distance c between the vertex 196 and the focus 192 of the parabolic curve 190) may also be determined as the distance L is determined. For example, when the distance L=50 μm, n=1.49, $\theta_{MAX}$=47.155°, and $\theta_{MIN}$=15°, according to the equation (8), c=0.957 μm, and in this case the distance D=10.731 μm. Or, the structure of the parabolic curve 190 (the distance c between the vertex 196 and the focus 192 of the parabolic curve 190) may also be determined as the distance L and the distance D are determined. That is, the distance c may satisfy an equation (9) and an equation (10) below at the same time $$4c \cdot (\cot\theta_{MIN} - \cot\theta_{MAX}) \approx D \quad (9)$$

$$4c \cdot [(\cot\theta_{MIN})^2 - (\cot\theta_{MAX})^2] \approx L \quad (10)$$

for example, when the distance L≈50 μm (for example, the distance L=49.85 μm), the distance D≈10 μm (for example, the distance D=10.699 μm), n=1.49, $\theta_{MAX}$=47.155°, and $\theta_{MIN}$=15°, according to the equation (9) and the equation (10), c=0.954 μm.

The mechanism through which the second surface 142b can reflect the light beam 1 to the light emitting surface 110 and enable the light beam 1' to exit from the light emitting surface 110 in the desired light exiting angle ψ is then illustrated in the following.

Referring to FIG. 7 and FIG. 8, the second surface 142b inclines away from the side 130a of the light incident surface 130, and the first surface 142a is between the light incident surface 130 and the second surface 142b. In this embodiment, a cross-sectional line obtained by cutting the second surface 142b along a direction perpendicular to the light incident surface 130 and the light emitting surface 110 includes a cross-sectional line J2, and the cross-sectional line J2 is substantially an inclined straight line inclining relative to the bottom surface 120. Specifically, in this embodiment, an acute angle γ included by the cross-sectional line J2 and the normal line N of the light emitting surface 110 satisfies an equation (11) below:

$$\frac{\left[90° + \varphi + \sin^{-1}\left(\frac{\sin\psi}{n}\right)\right]}{2} - 15° \leq \gamma \leq \frac{\left[90° + \varphi + \sin^{-1}\left(\frac{\sin\psi}{n}\right)\right]}{2} + 15° \quad (11)$$

where ψ is a desired angle included by an exiting light beam 1' and a normal line N' of the light emitting surface 110, φ is an angle included by the reference plane 122 parallel to the bottom surface 120 and the symmetry axis 194 of the parabolic curve 190, and n is the index of refraction of the light guide plate. When the acute angle γ satisfies the equation (11), the second surface 142b can reflect the light beam 1 reflected by the first surface 142a to the light emitting surface 110, and enable the light beam 1' to exit in the specific angle ψ. In other words, in order to enable the light beam 1' to exit in the specific angle ψ, the design of the second surface 142b of the first optical microstructure 142' can be obtained by using the aforementioned equation (11) without complicated simulation, thereby reducing time required for developing the backlight module 1000'.

For example, in order that the desired angle ψ included by the exiting light beam 1' and the normal line N' of the light emitting surface 110 is 30° when n=1.49 and φ=0°, the acute angle γ included by the cross-sectional line J2 and the normal line N of the light emitting surface 110 may be designed to be between 39.8° and 69.8°. In order that the desired angle ψ included by the exiting light beam 1' and the normal line N' of the light emitting surface 110 is 0° when n=1.49 and φ=0°, the acute angle γ included by the cross-sectional line J2 and the normal line N of the light emitting surface 110 may be designed to be between 30° and 60°.

Figure 10A:
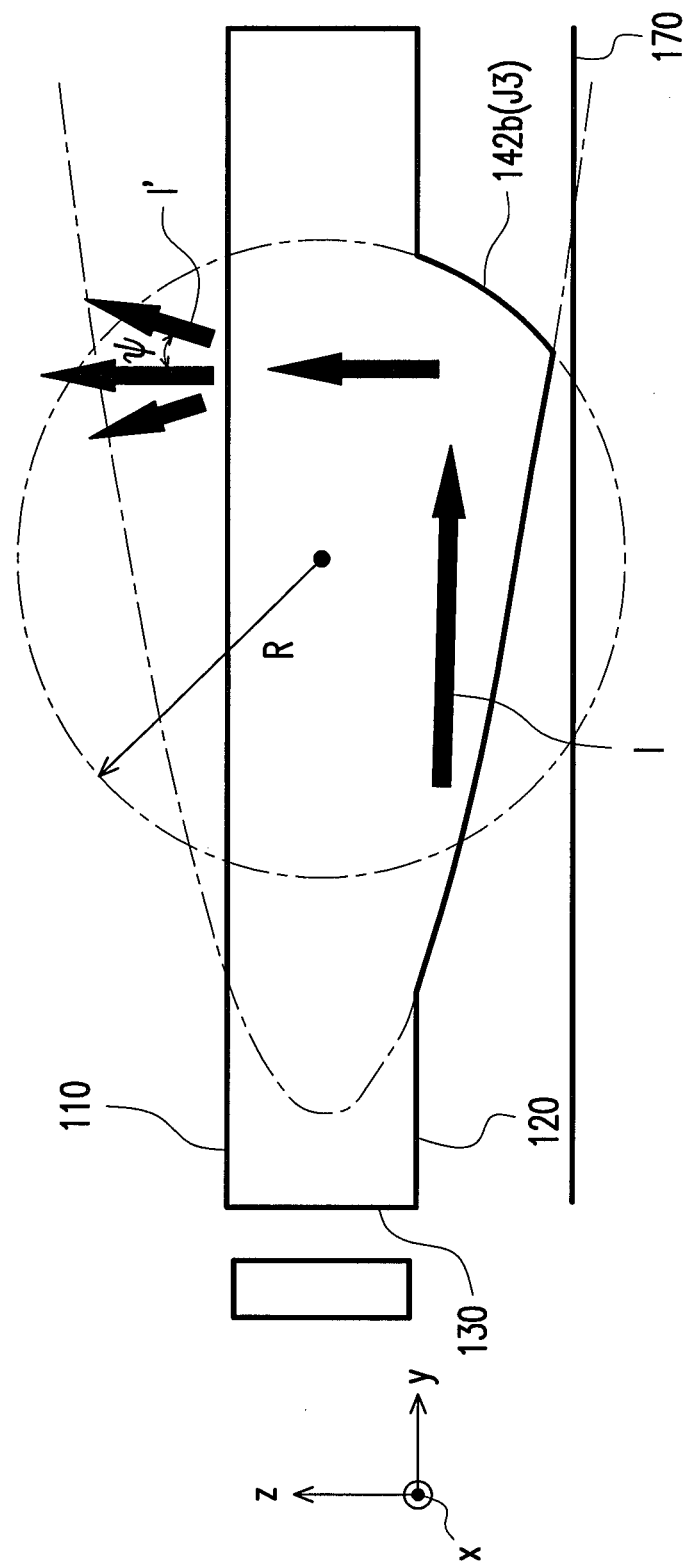
FIG. 10A and FIG. 10B are schematic sectional views of the backlight module according to the embodiments of the invention, respectively.
Figure 10B:
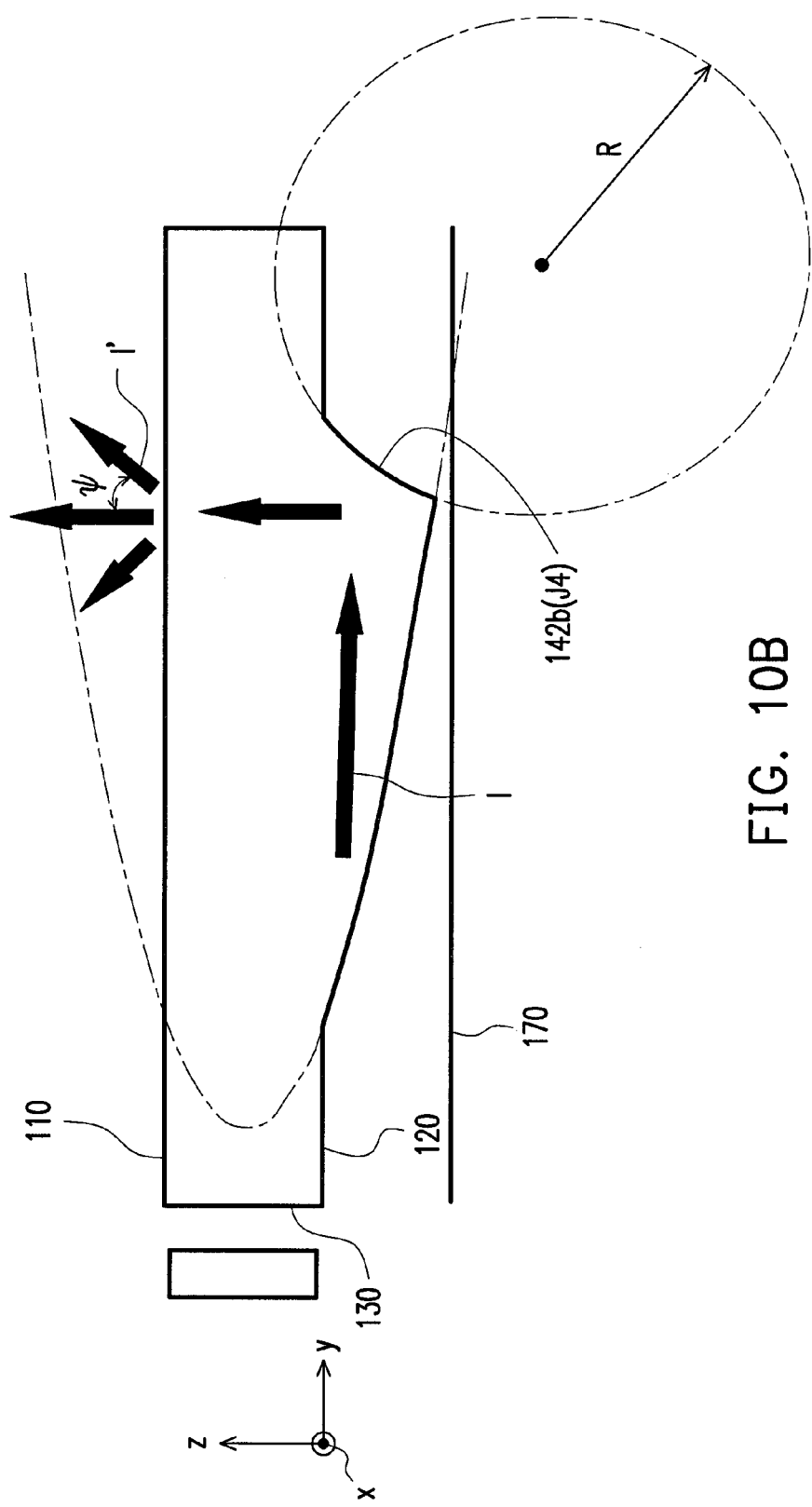

However, the invention is not limited thereto. As shown in FIG. 10A, in another embodiment, a cross-sectional line obtained by cutting the second surface 142b along the direction perpendicular to the light incident surface 130 and the light emitting surface 110 includes a cross-sectional line J3, and the cross-sectional line J3 may also substantially be a curve line protruding away from the bottom surface 120 and inclines away from the light incident surface 130. Specifically, the curved line may be an arc line taken from a circle with a radius R being greater than 100 μm. For example, as shown in FIG. 10A, the center of the circle is between the side 130a of the incident surface 130 and cross-sectional line J3. The second surface 142b shown in FIG. 10A can enable a distribution range of the light exiting angle ψ of the exiting light beam 1' to be narrow. As shown in FIG. 10B, in another embodiment, a cross-sectional line obtained by cutting the second surface 142b along the direction perpendicular to the light incident surface 130 and the light emitting surface 110 includes a cross-sectional line J4. More specifically, the curved line may be an arc line taken from a circle with a radius R being greater than 100 μm. For example, as shown in FIG. 10B, the center of the circle is between the side opposite to the side 130a of the incident surface 130 and cross-sectional line J4. The second surface 142b shown in FIG. 10B can enable a distribution range of the light exiting angle ψ of the exiting light beam 1' to be wide.

As shown in FIG. 7, if the first optical microstructure 142' of this embodiment is not able to reflect all of the light beam 1 to the light emitting surface 110 to exit from the light emitting surface 110, the second optical microstructure 144 of the backlight module 1000' of this embodiment may guide the light beam 1 running out of the light guide plate 100 from the first optical microstructure 142' to the light emitting surface 110, and enable the light beam 1' to exit in the desired light exiting angle ψ. In this way, light utilization efficiency of the backlight module 1000' of this embodiment is increased. The backlight module 1000' of this embodiment has similar advantages and effects as the backlight module 1000 of the first embodiment, and are not repeated herein.

Third Embodiment

Figure 11:
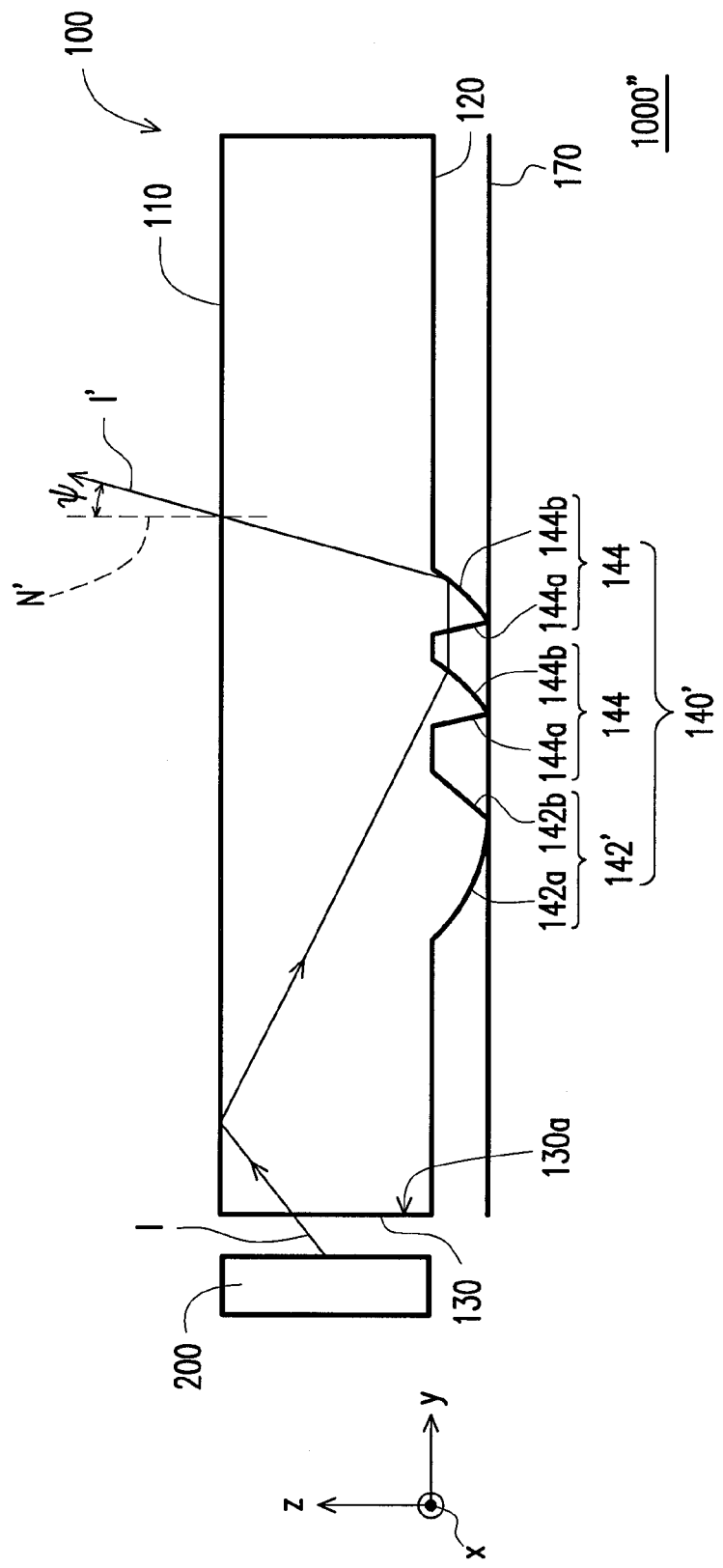
FIG. 11 is a schematic sectional view of a backlight module according to a third embodiment of the invention.

FIG. 11 is a schematic sectional view of a backlight module according to a third embodiment of the invention. Referring to FIG. 11, a backlight module 1000" of this embodiment is similar to the backlight module 1000' of the second embodiment. A major difference between the backlight module 1000" and the backlight module 1000' is as follows. In the backlight module 1000" of this embodiment, each optical unit 140' includes two second optical microstructures 144, and the two second optical microstructures 144 may be same. In another embodiment, the two second optical microstructures 144 may be different in shape.

The backlight module 1000" of this embodiment includes a light guide plate 100, and a light-emitting element 200. The light guide plate 100 includes a light emitting surface 110 (for example, a plane parallel to an xy plane), a bottom surface 120 (for example, the xy plane) opposite to the light emitting surface 110, a light incident surface 130 (for example, a plane parallel to an xz plane) connecting the light emitting surface 110 and the bottom surface 120, and a plurality of optical units 140' disposed on the bottom surface 120.

Figure 12:
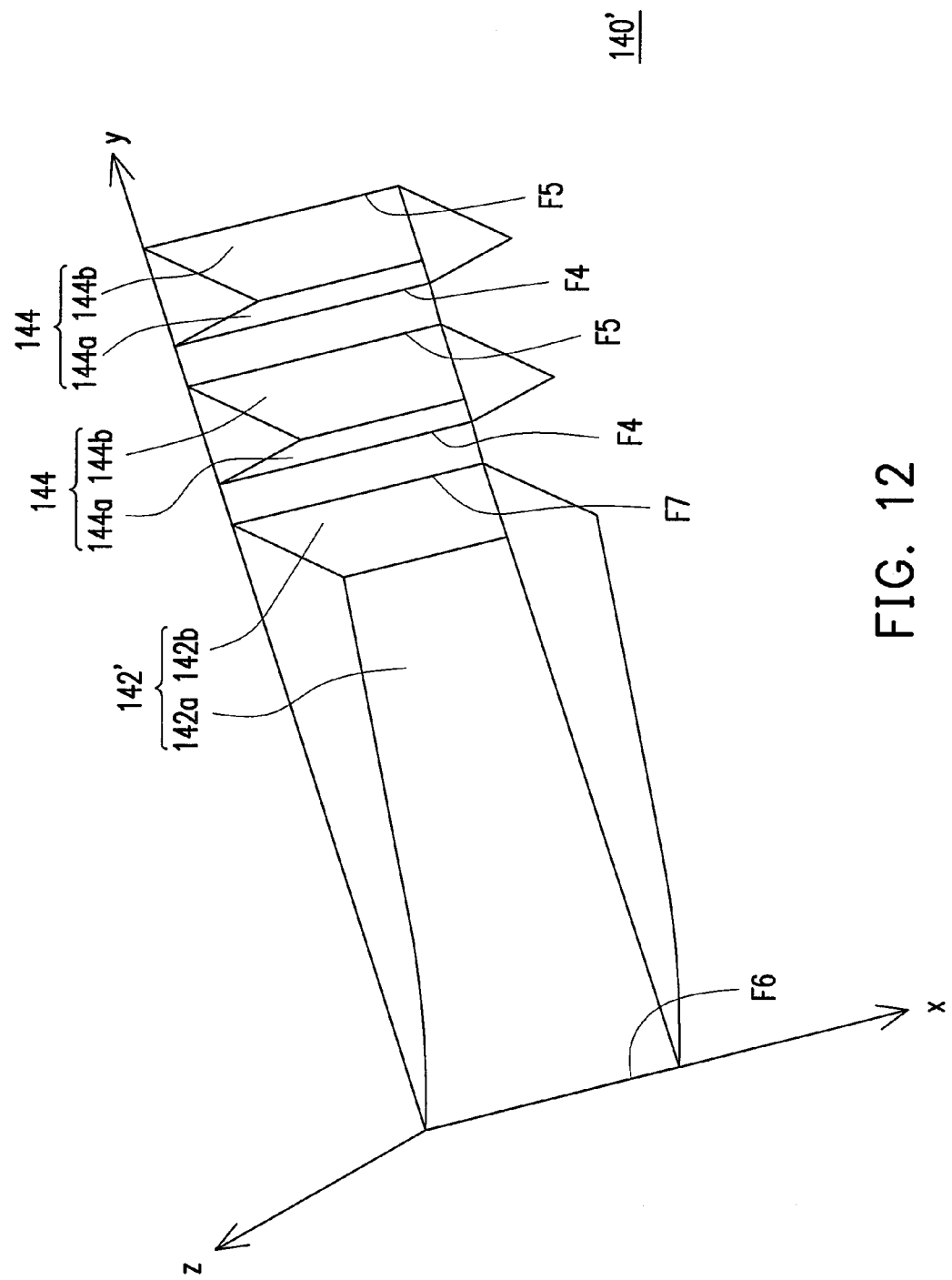
FIG. 12 is a schematic three-dimensional view of an optical unit according to the third embodiment of the invention.

FIG. 12 is a schematic three-dimensional view of the optical unit 140' according to this embodiment. Referring to FIG. 11 and FIG. 12, in this embodiment, a cross-sectional line obtained by cutting the first surface 144a of the second optical microstructure 144 along a direction (e.g., the xy plane) perpendicular to the light incident surface 130 and parallel to the light emitting surface 110 includes a cross-sectional line F4. The cross-sectional line F4 is a straight line. A cross-sectional line obtained by cutting the second surface 144b of the second optical microstructure 144 along the direction perpendicular to the light incident surface 130 and parallel to the light emitting surface 110 includes a cross-sectional line F5. The cross-sectional line F5 is a straight line. A cross-sectional line obtained by cutting the first surface 142a of the first optical microstructure 142' along the direction perpendicular to the light incident surface 130 and parallel to the light emitting surface 110 includes a cross-sectional line F6. The cross-sectional line F6 is a straight line. A cross-sectional line obtained by cutting the second surface 142b of the first optical microstructure 142' along the direction perpendicular to the light incident surface 130 and parallel to the light emitting surface 110 includes a cross-sectional line F7. The cross-sectional line F7 is a straight line. The cross-sectional line F4, the cross-sectional line F5, the cross-sectional line F6, and the cross-sectional line F7 are substantially parallel to each other. Specifically, the cross-sectional lines F4, F5, F6, and F7 are parallel to the light incident surface 130. In other words, the optical unit 140' of this embodiment may be three bar-shaped ribs extending along a direction substantially parallel to the light emitting surface 110. However, the invention is not limited thereto.

Figure 13:
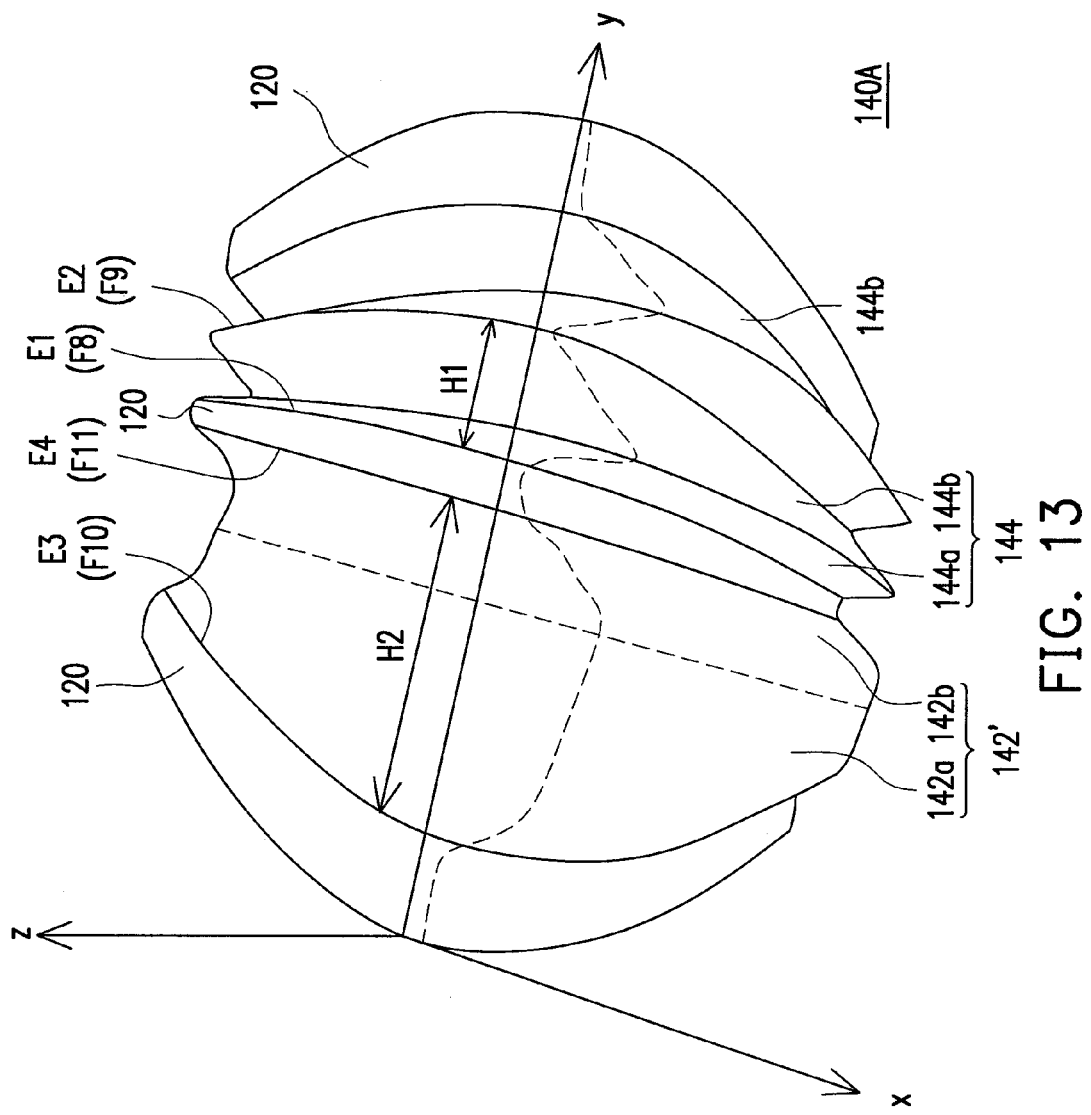
FIG. 13, FIG. 14, and FIG. 15 are schematic three-dimensional views of an optical unit according to embodiments of the invention, respectively.

FIG. 13 is a schematic three-dimensional view of an optical unit according to another embodiment of the invention. Referring to FIG. 13, an optical unit 140A of this embodiment is similar to the optical unit 140' of the third embodiment. A difference between the optical unit 140A and the optical unit 140' is as follows. In this embodiment, a distance H1 from a boundary E1 between the first surface 144a of the second optical microstructure 144 and the bottom surface 120 to a boundary E2 between the second surface 144b of the second optical microstructure 144 and the bottom surface 120 decreases from a center of the second optical microstructure 144 to two sides of the second optical microstructure 144. A distance H2 from a boundary E3 between the first surface 142a of the first optical microstructure 142' and the bottom surface 120 to a boundary E4 between the second surface 142b of the first optical microstructure 142' and the bottom surface 120 decreases from a center of the first optical microstructure 142' to two sides of the first optical microstructure 142'. It can be seen in another perspective that a cross-sectional line obtained by cutting the first surface 144a of the second optical microstructure 144 along a direction perpendicular to the light incident surface 130 and parallel to the light emitting surface 110 includes a cross-sectional line F8. The cross-sectional line F8 may be a straight line or an arc line. A cross-sectional line obtained by cutting the second surface 144b of the second optical microstructure 144 along the direction perpendicular to the light incident surface 130 and parallel to the light emitting surface 110 includes a cross-sectional line F9. The cross-sectional line F9 is an arc line, and the concavity of the arc line faces the light incident surface 130. A cross-sectional line obtained by cutting the first surface 142a of the first optical microstructure 142' along the direction perpendicular to the light incident surface 130 and parallel to the light emitting surface 110 includes a cross-sectional line F10. The cross-sectional line F10 is an arc line, and the concavity of the arc line is away from the light incident surface 130. A cross-sectional line obtained by cutting the second surface 142b of the first optical microstructure 142' along the direction perpendicular to the light incident surface 130 and parallel to the light emitting surface 110 includes a cross-sectional line F11. The cross-sectional line F11 may be a straight line or an arc line.

Figure 14:
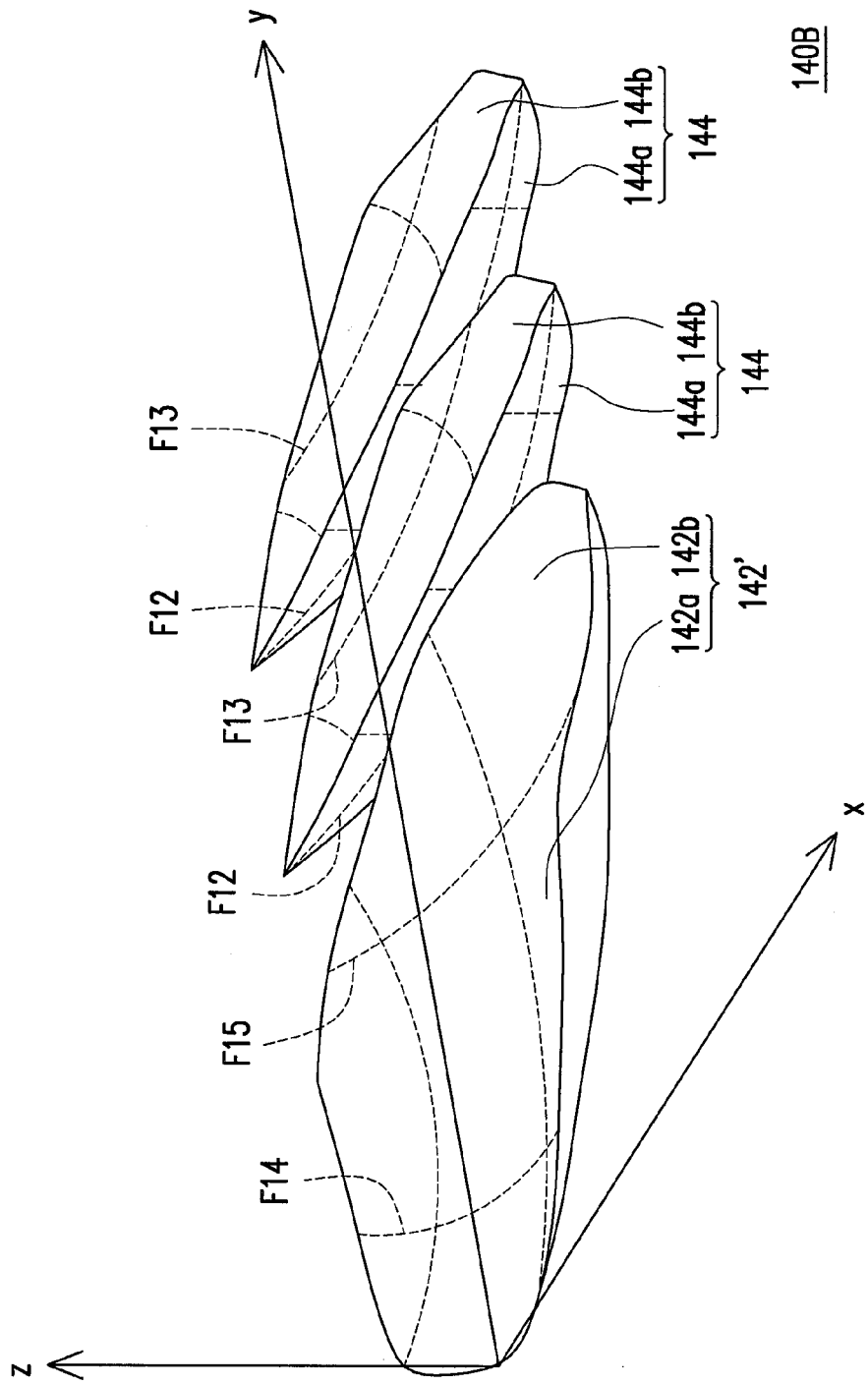

FIG. 14 is a schematic three-dimensional view of an optical unit according to another embodiment of the invention. Referring to FIG. 11 and FIG. 14, an optical microstructure 140B of this embodiment is similar to an optical microstructure 140' of the third embodiment. A difference between the optical microstructure 140B and the optical microstructure 140' is as follows. In this embodiment, a cross-sectional line obtained by cutting the first surface 144a of the second optical microstructure 144 along a direction (e.g., the xz plane) parallel to the light incident surface 130 and perpendicular to the light emitting surface 110 includes a cross-sectional line F12. The cross-sectional line F12 is a straight line. A cross-sectional line obtained by cutting the second surface 144b of the second optical microstructure 144 along the direction (e.g., the xz plane) parallel to the light incident surface 130 and perpendicular to the light emitting surface 110 includes a cross-sectional line F13. The cross-sectional line F13 is an arc line. A cross-sectional line obtained by cutting the first surface 142a of the first optical microstructure 142' along the direction (e.g., the xz plane) parallel to the light incident surface 130 and perpendicular to the light emitting surface 110 includes a cross-sectional line F14. The cross-sectional line F14 is an arc line. A cross-sectional line obtained by cutting the second surface 142b of the first optical microstructure 142' along the direction (e.g., the xz plane) parallel to the light incident surface 130 and perpendicular to the light emitting surface 110 includes a cross-sectional line F15. The cross-sectional line F15 is an arc line. The concavity of each of the cross-sectional lines F12, F13, F14, and F15 faces the light emitting surface 110.

Figure 15:
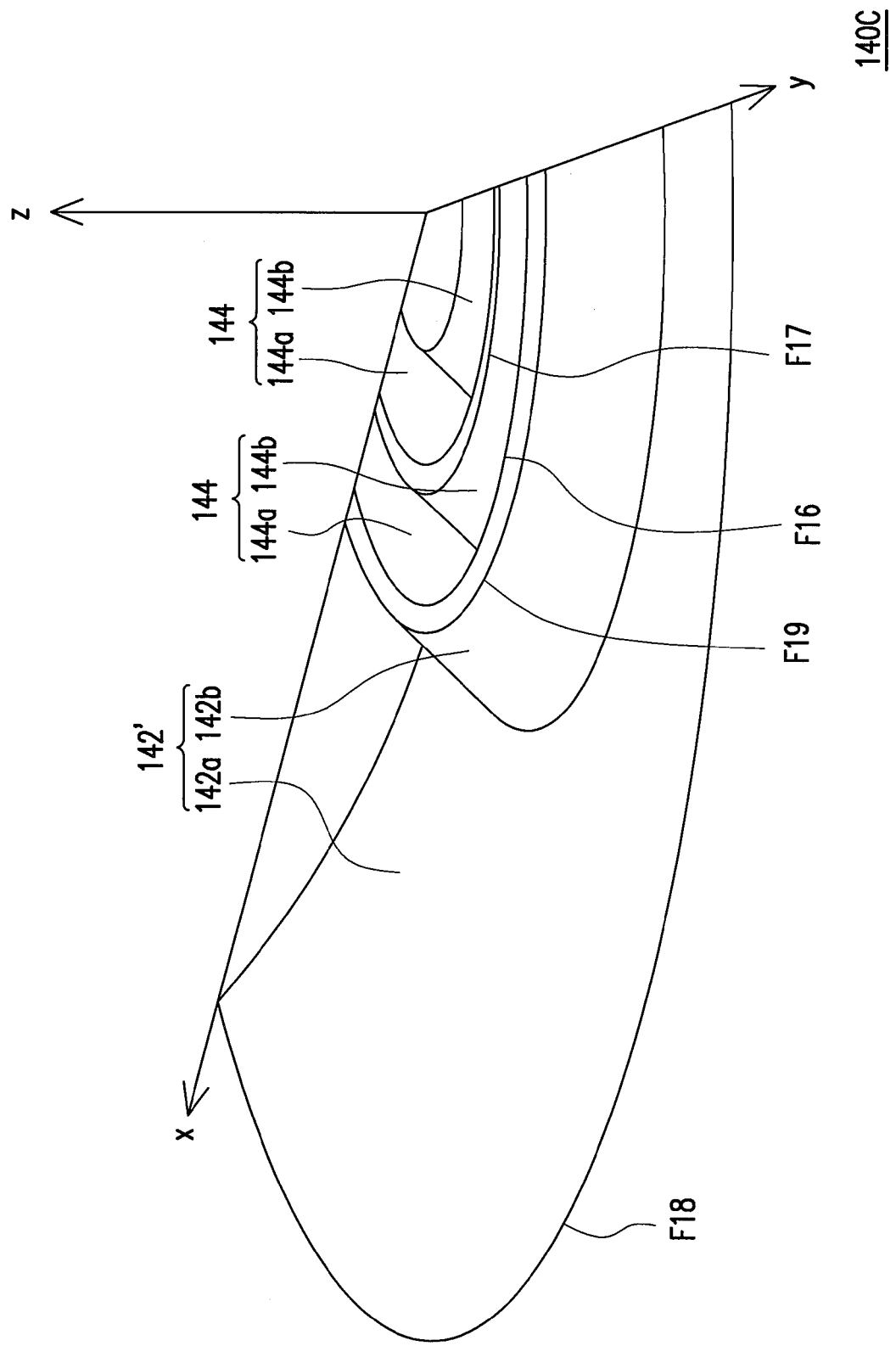

FIG. 15 is a schematic three-dimensional view of an optical microstructure according to another embodiment. Referring to FIG. 15, an optical microstructure 140C of this embodiment is similar to the optical microstructure 140' of the third embodiment. A difference between the optical microstructure 140C and the optical microstructure 140' is as follows. In this embodiment, a cross-sectional line obtained by cutting the first surface 144a of the second optical microstructure 144 along a direction (e.g., the xy plane) perpendicular to the light incident surface 130 and parallel to the light emitting surface 110 includes a cross-sectional line F16. The cross-sectional line F16 is an arc line. A cross-sectional line obtained by cutting the second surface 144b of the second optical microstructure 144 along the direction (e.g., the xy plane) perpendicular to the light incident surface 130 and parallel to the light emitting surface 110 includes a cross-sectional line F17. The cross-sectional line F17 is an arc line. A cross-sectional line obtained by cutting the first surface 142a of the first optical microstructure 142' along the direction perpendicular to the light incident surface 130 and parallel to the light emitting surface 110 includes a cross-sectional line F18. The cross-sectional line F18 is an arc line. A cross-sectional line obtained by cutting the second surface 142b of the first optical microstructure 142' along the direction perpendicular to the light incident surface 130 and parallel to the light emitting surface 110 includes a cross-sectional line F19. The cross-sectional line F19 is an arc line. A radius of curvature of the cross-sectional line F18 is greater than a radius of curvature of the cross-sectional line F19. The radius of curvature of the cross-sectional line F19 is greater than a radius of curvature of the cross-sectional line F16. The radius of curvature of the cross-sectional line F16 is greater than a radius of curvature of the cross-sectional line F17. The cross-sectional lines F16, F17, F18, and F19 are concentric.

A distance between any two optical microstructures in the optical unit of any aforementioned embodiment may be between 0 μm and 50 μm. In one of the embodiments, as shown in FIG. 11, the distance between any two optical microstructures decreases along a direction departing from the light incident surface 130 (that is, a y direction). That is to say, a distance between the first optical microstructure 14T and the second optical microstructure 144 adjacent to the light incident surface 130 is greater than a distance between the second optical microstructure 144 adjacent to the light incident surface 130 and the second optical microstructure 144 away from the light incident surface 130. In other embodiments, the distance between any two optical microstructures is the same.

The backlight module 1000" of this embodiment has similar advantages and effects as the backlight module 1000 of the first embodiment, and are not repeated herein.

Fourth Embodiment

Figure 16:
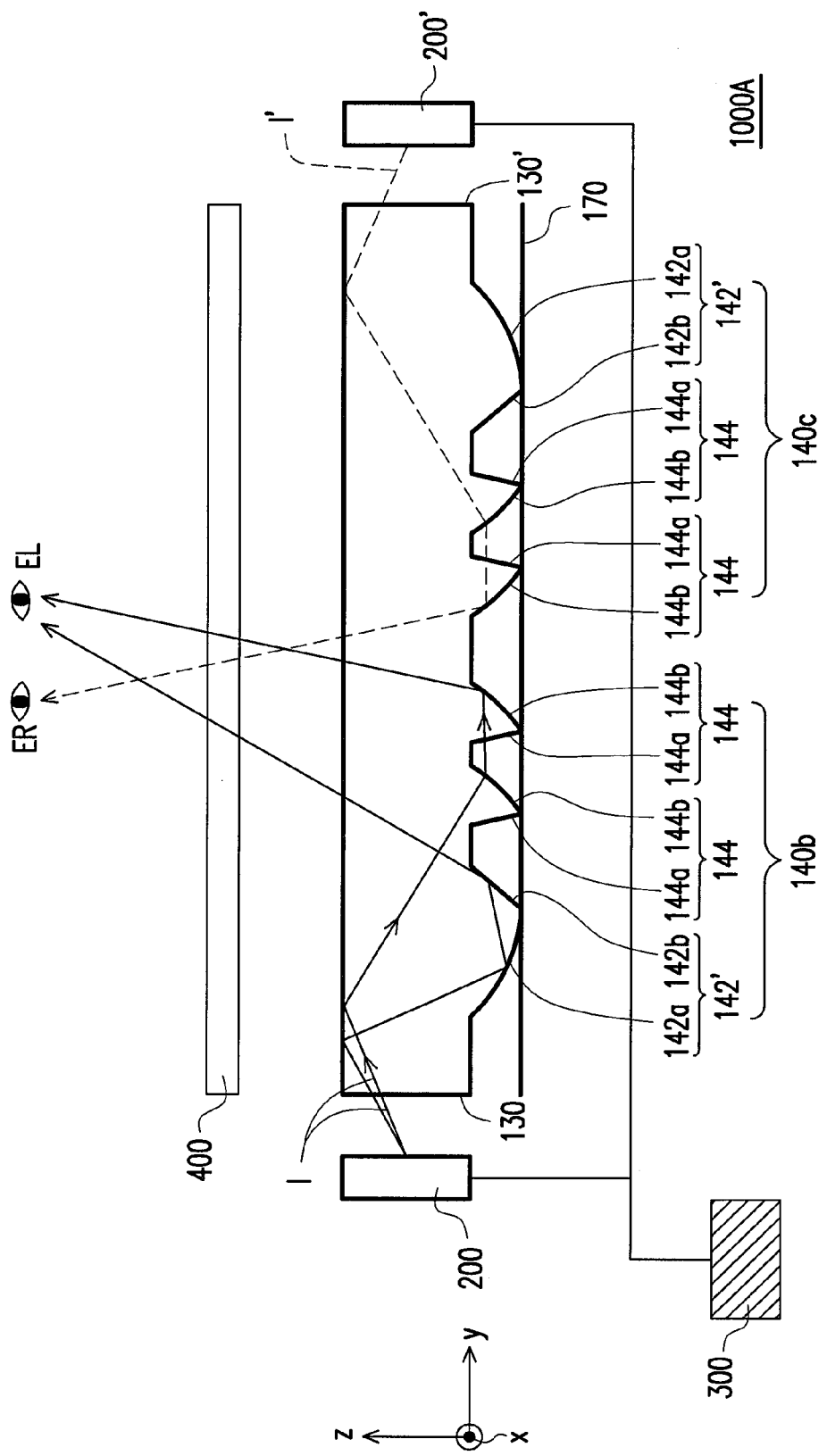
FIG. 16 is a schematic sectional view of a backlight module according to a fourth embodiment of the invention.

FIG. 16 is a schematic sectional view of a backlight module according to a fourth embodiment of the invention. Referring to FIG. 16, a backlight module 1000A of this embodiment is similar to the backlight module 1000" of the third embodiment. A major difference between the backlight module 1000A and the backlight module 1000" is as follows. In the backlight module 1000A of this embodiment, an optical unit includes a first optical unit 140b and a second optical unit 140c. Furthermore, the backlight module 1000A of this embodiment further includes two light-emitting elements 200 and 200' blinking alternately. The difference between the backlight module 1000A and the backlight module 1000" is described below, and similarities between the backlight module 1000A and the backlight module 1000" are not repeated herein.

The backlight module 1000A of this embodiment includes a light guide plate 100 and the two light-emitting elements 200 and 200'. The light guide plate 100 includes a light emitting surface 110, a bottom surface 120 opposite to the light emitting surface 110, a first light incident surface 130 and a second light incident surface 130' connecting the light emitting surface 110 and the bottom surface 120 and opposite to each other, and a plurality of optical units 140b and 140c disposed on the bottom surface 120. In this embodiment, the light-emitting elements 200 and 200' respectively are disposed beside the first light incident surface 130 and the second light incident surface 130'.

The optical units in this embodiment include the first optical units 140b and the second optical units 140c. Each of the first optical units 140b and 140c include the first optical microstructure 142' and the second optical microstructure 144. The first surface 144a of the second optical microstructure 144 of each first optical unit 140b inclines towards a side of the first light incident surface 130. The second surface 144b of the second optical microstructure 144 of each first optical unit 140b inclines away from the side of the first light incident surface 130. The first surface 142a of the first optical microstructure 142' of each first optical unit 140b inclines towards the side of the first light incident surface 130. The second surface 142b of the first optical microstructure 142' of each first optical unit 140b inclines away from the side of the first light incident surface 130. The first surface 144a of the second optical microstructure 144 of each second optical unit 140c inclines towards a side of the second light incident surface 130'. The second surface 144b of the second optical microstructure 144 of each second optical unit 140c inclines away from the side of the second light incident surface 130'. The first surface 142a of the first optical microstructure 142' of each second optical unit 140c inclines towards the side of the second light incident surface 130'. The second surface 142b of the first optical microstructure 142' of each second optical unit 140c inclines away from the side of the second light incident surface 130'.

Figure 17:
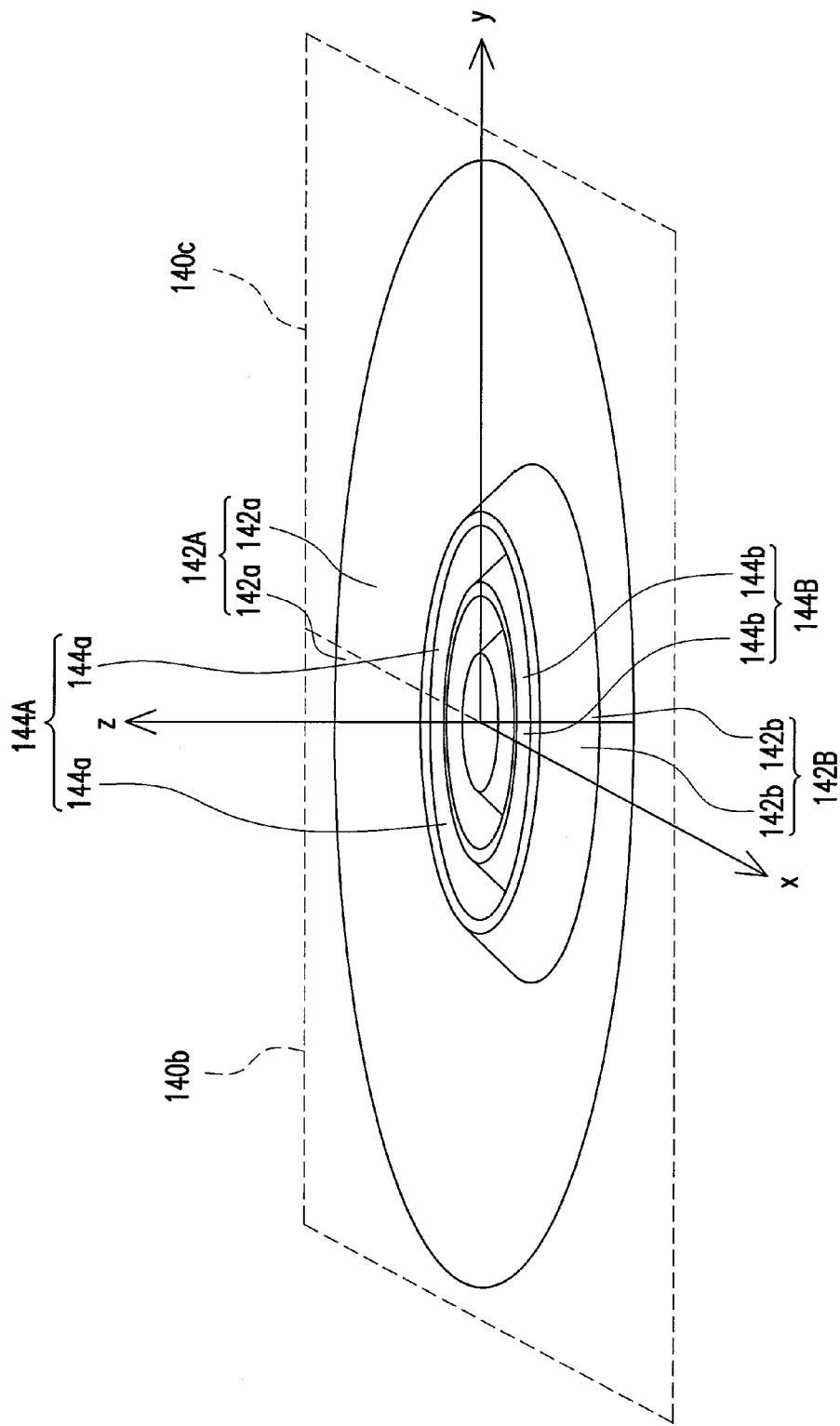
FIG. 17 is a schematic three-dimensional view of a first optical unit and a second optical unit according to the fourth embodiment of the invention.

FIG. 17 is a schematic three-dimensional view of the first optical unit 140b and the second optical unit 140c of this embodiment. Referring to FIG. 16 and FIG. 17, in this embodiment, the first surface 144a of the second optical microstructure 144 of each of the first optical units 140b and the first surface 144a of the second optical microstructure 144 of corresponding one of the second optical units 140c are connected to form a first ring-shaped surface 144A. The second surface 144b of the second optical microstructure 144 of each of the first optical units 140b and the second surface 144b of the second optical microstructure 144 of corresponding one of the second optical units 140c are connected to form a second ring-shaped surface 144B. The first surface 142a of the first optical microstructure 142' of each of the first optical units 140b and the first surface 142a of the first optical microstructure 142' of corresponding one of the second optical units 140c are connected to form a third ring-shaped surface 142A. The second surface 142b of the first optical microstructure 142' of each of the first optical units 140b and the second surface 142b of the first optical microstructure 142' of corresponding one of the second optical units 140c are connected to form a fourth ring-shaped surface 142B. Furthermore, the third ring-shaped surface 142A surrounds the fourth ring-shaped surface 142B, the fourth ring-shaped surface 142B surrounds the first ring-shaped surface 144A, and the first ring-shaped surface 144A surrounds the second ring-shaped surface 144B. In other words, the optical unit of this embodiment may be round objects protruding outwards from the bottom surface 120. However, in another embodiment, the first optical unit 140b and the second optical unit 140c may be separated from each other and not interconnected. Similarly, the optical units 140, 140', 140A, 140B, and 140C of other aforementioned embodiments may also be divided into a plurality of first optical units and a plurality of second optical units separated from first optical units.

Referring to FIG. 16, the backlight module 1000A of this embodiment may further include a control unit 300. The control unit 300 is electrically connected to the two light-emitting elements 200 and 200', so as to drive the two light-emitting elements 200 and 200' to blink (i.e. turn on or turn off) alternately. In other words, when the light-emitting element 200 emits a light beam 1, the light-emitting element 200' does not emit a light beam 1', and when the light-emitting element 200' emits the light beam 1', the light-emitting element 200 does not emit the light beam 1. In this embodiment, a display panel 400 may be disposed above the backlight module 1000A, so as to form a stereoscopic display. The display panel 400 may be a transmissive display panel or a semi-transmissive/semi-reflective display panel. Specifically, when the light-emitting element 200 emits the light beam 1, the display panel 400 displays a left-eye image to a left eye (EL) depicted in FIG. 16. The light beam 1 emitted by the light-emitting element 200 may run out from the second surface 144b, close to the light incident surface 130, of the first optical unit 140b, and may be reflected by the second surface 144b, away from the light incident surface 130, of the first optical unit 140b, and be transmitted towards a right-top position of FIG. 16. At this time, the light beam 1 carries the left-eye image through the display panel 400, so as to transmit the left-eye image to a left eye (EL) of a user depicted in FIG. 16. Similarly, when the light-emitting element 200' emits the light beam 1', the display panel 400 displays a right-eye image to a right eye (ER) depicted in FIG. 16. The light beam P emitted by the light-emitting element 200' may run out from the second surface 144b, close to the light incident surface 130', of the second optical unit 140c, and may be reflected by the second surface 144b, away from the light incident surface 130', of the second optical unit 140c, and be transmitted towards a left-top position of FIG. 16. At this time, the light beam 1' carries the right-eye image through the display panel 400, so as to transmit the right-eye image to a right eye (ER) of the user depicted in FIG. 16. By the light beam 1 and the light beam 1' carrying the left-eye image and the right-eye image alternately, the user can view a stereoscopic image.

Figure 18:
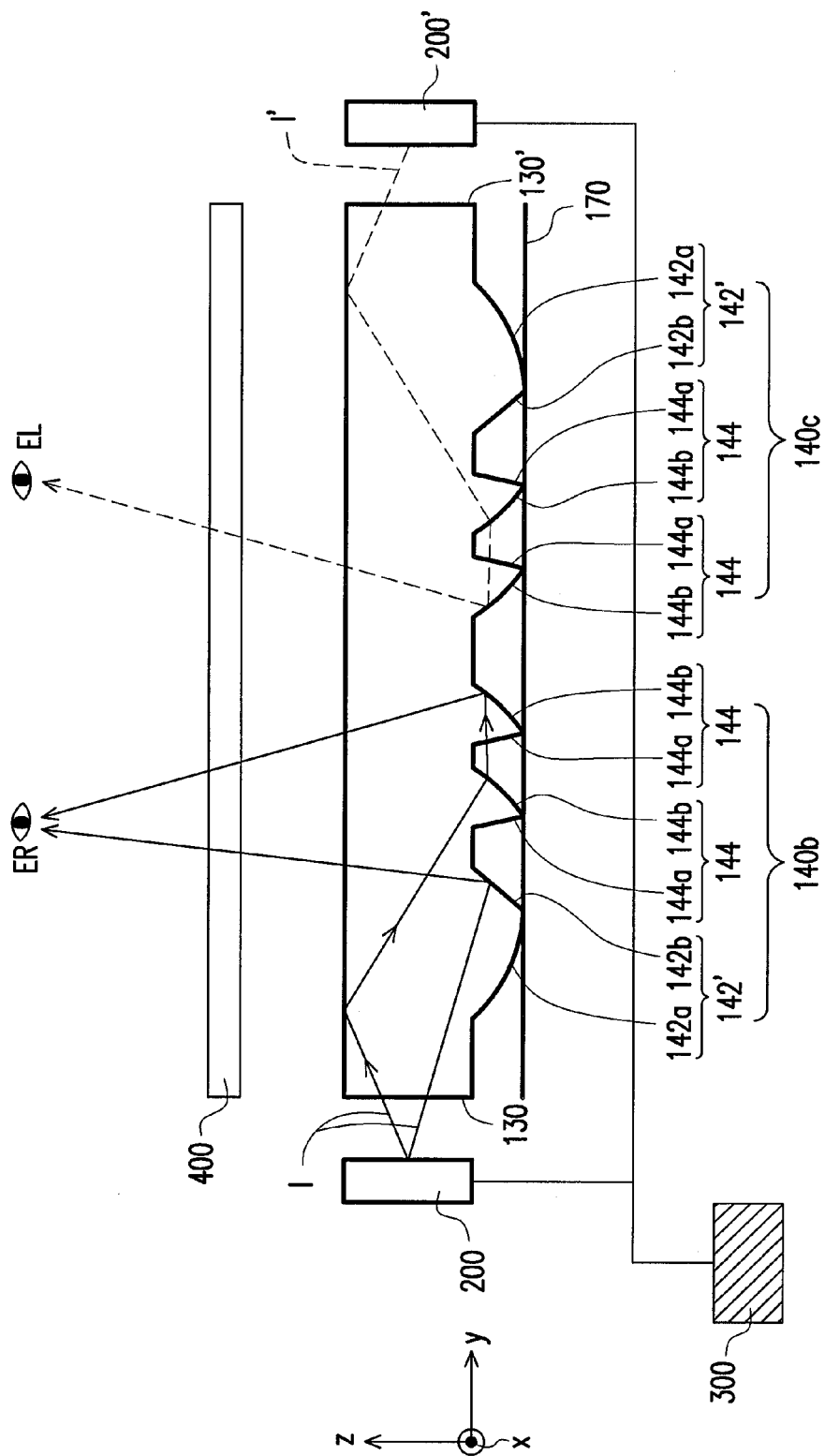
FIG. 18 is a schematic sectional view of a backlight module according to an embodiment of the invention.

However, the invention is not limited thereto. FIG. 18 is a schematic sectional view of a backlight module according to another embodiment of the invention. Referring to FIG. 18, in this embodiment, by adjusting the structure of the first optical unit 140b (for example, by adjusting an angle of inclination of the second surface 144b, away from the light incident surface 130, of the first optical unit 140b), the light beam 1 emitted by the light-emitting element 200 may be reflected by the second surface 144b, away from the light incident surface 130, of the first optical unit 140b, and transmitted towards the left-top position of FIG. 18. At this time, the light beam 1 carries the right-eye image through the display panel 400, so as to transmit the right-eye image to the right eye (ER) of the user depicted in FIG. 18. Similarly, by adjusting the structure of the second optical unit 140c (for example, by adjusting an angle of inclination of the second surface 144b, away from the light incident surface 130', of the second optical unit 140c), the light beam 1' emitted by the light-emitting element 200' may be reflected by the second surface 144b, away from the light incident surface 130', of the second optical unit 140c, and transmitted towards the right-top position of FIG. 18. In other words, inclination of the second surfaces 144b of this embodiment is, for example, greater than inclination of the second surfaces 144b of FIG. 16 respectively. At this time, the light beam 1' carries the left-eye image through the display panel 400, so as to transmit the left-eye image to the left eye (EL) of the user depicted in FIG. 18. By the light beam 1 and the light beam 1' carrying the right-eye image and the left-eye image alternately, the user can view a stereoscopic image. The backlight module 1000A of this embodiment has similar advantages and effects as the backlight module 1000 of the first embodiment, and are not repeated herein.

Fifth Embodiment

Figure 19:
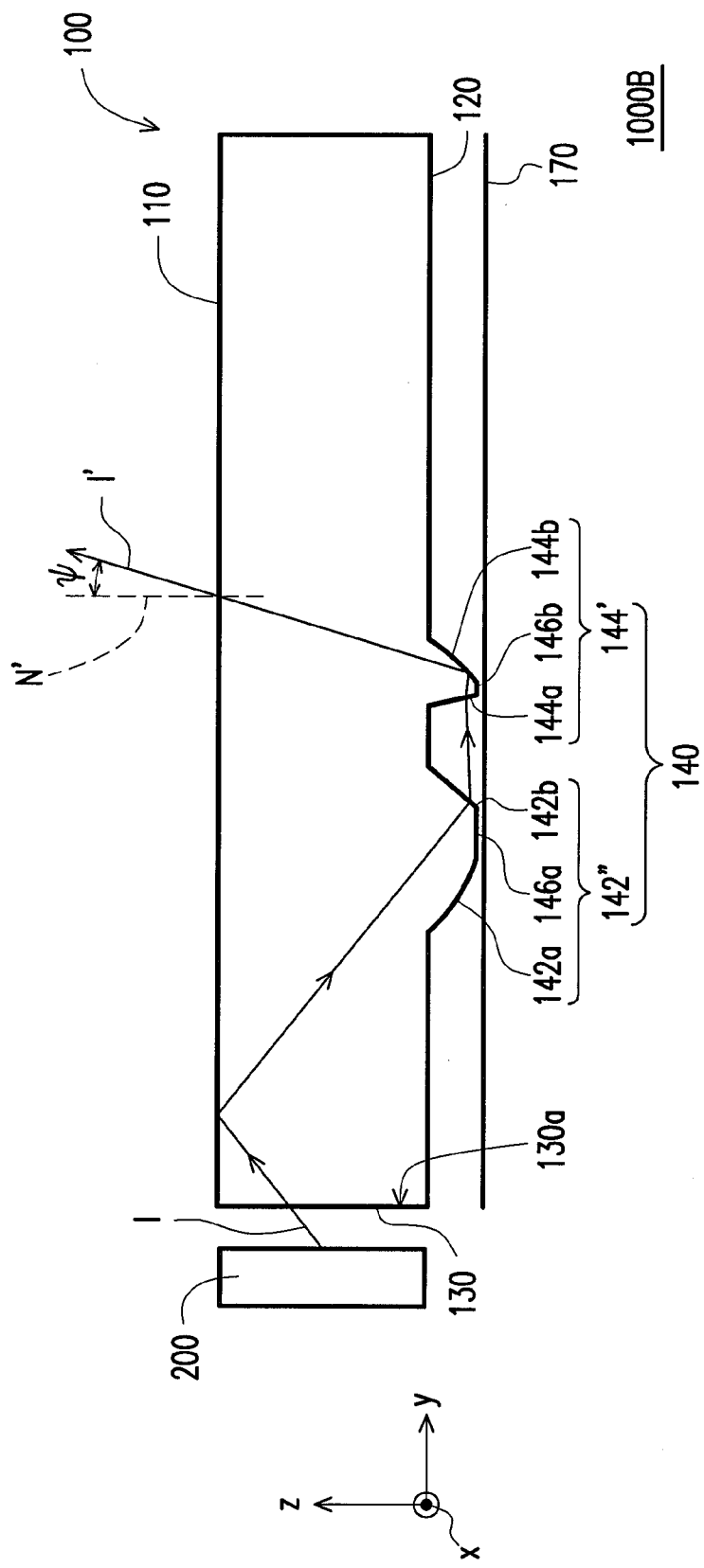
FIG. 19 is a schematic sectional view of a backlight module according to a fifth embodiment of the invention.

FIG. 19 is a schematic sectional view of a backlight module according to a fifth embodiment of the invention. Referring to FIG. 19, a backlight module 1000B of this embodiment is similar to the backlight module 1000' of the second embodiment. Therefore, like elements are indicated by like element numerals. A difference between the backlight module 1000B of this embodiment and the backlight module 1000' of the second embodiment is as follows. A first optical microstructure 142" of this embodiment further has a first connecting surface 146a, and a second optical microstructure 144' of this embodiment further has a second connecting surface 146b. The difference between the backlight module 1000B and the backlight module 1000' is further described below, and similarities between the backlight module 1000B and the backlight module 1000' are not repeated herein.

The first optical microstructure 142" of this embodiment further has the first connecting surface 146a. The first connecting surface 146a connects the first surface 142a and the second surface 142b of the first optical microstructure 142". The second optical microstructure 144' of this embodiment further has the second connecting surface 146b. The second connecting surface 146b connects the first surface 144a and the second surface 144b of the second optical microstructure 144'. In this embodiment, the first connecting surface 146a and the second connecting surface 146b are, for example, at least one plane. However, the invention does not specifically limit a shape of the first connecting surface 146a or a shape of the second connecting surface 146b. For example, in other embodiments, the first connecting surface 146a may be at least one curved surface or a combination of at least one plane and at least one curved surface, while the second connecting surface 146b may be a plane. The backlight module 1000B of this embodiment has similar advantages and effects as the backlight module 1000' of the second embodiment, and are not repeated herein.

Sixth Embodiment

Figure 20:
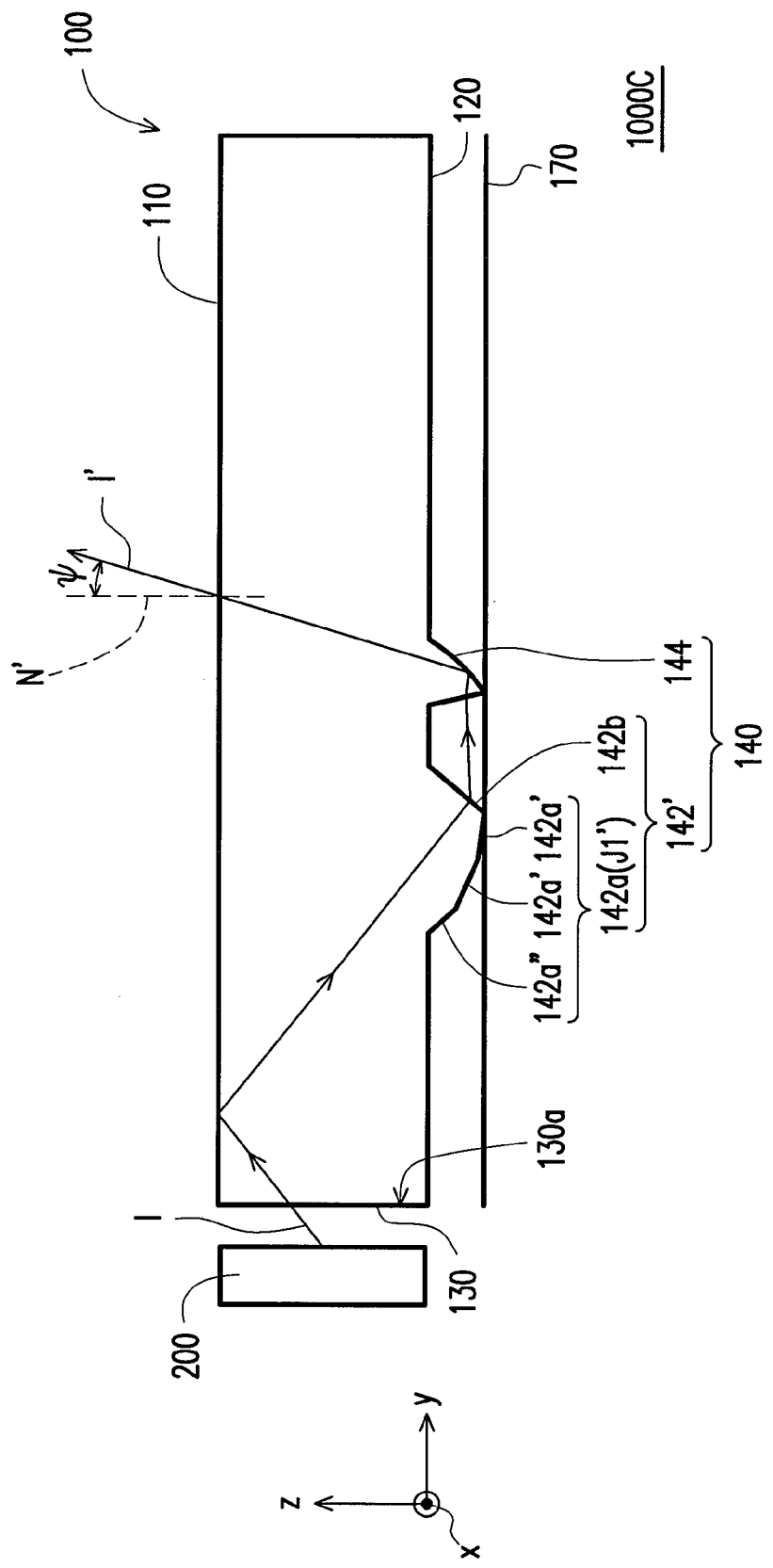
FIG. 20 is a schematic sectional view of a backlight module according to a sixth embodiment of the invention.

FIG. 20 is a schematic sectional view of a backlight module according to a sixth embodiment of the invention. Referring to FIG. 20, a backlight module 1000C according to the sixth embodiment of the invention is similar to the backlight module 1000' according to the second embodiment of the invention. Therefore, like elements are indicated by like element numerals. A difference between the backlight module 1000C of this embodiment and the backlight module 1000' of the second embodiment is, a cross-sectional line J1' of this embodiment is different from the cross-sectional line J1 of the second embodiment. The difference between the backlight module 1000C and the backlight module 1000' is further described below, and similarities between the backlight module 1000C and the backlight module 1000' are not repeated herein.

The cross-sectional line J1' of this embodiment is substantially a part of a parabolic curve. For example, the cross-sectional line J1' of this embodiment may be formed by a plurality of inclined lines 142a' inclined relative to the bottom surface 120 and interconnected. However, the invention is not limited thereto. The cross-sectional line J1' may also be formed by a plurality of interconnected curved lines, or be formed by an inclined line 142a' inclined relative to the bottom surface 120 and a curved line 142a" that are interconnected. In other words, the term "substantially a part of a parabolic curve" when being used to described the cross-sectional line J1' means that it is a part of a parabolic curve or it may be formed by interconnecting a polarity of inclined lines, curved lines, or combination thereof to approximate to a part of a parabolic curve. The backlight module 1000C of this embodiment has similar advantages and effects as the backlight module 1000' of the second embodiment, which are not repeated herein.

In view of the above, the embodiments of the invention have at least one of the following advantages or effects. In the light guide plate and the backlight module according to the embodiments of the invention, the second optical microstructure of the optical unit can re-guide the light beam running out of the light guide plate from the first optical microstructure of the optical unit into the light guide plate, so as to enable the light beam to be re-used in the backlight module, thereby increasing light utilization efficiency of the light guide plate and the backlight module according to the embodiments of the invention.

In addition, the second optical microstructure according to the embodiments of the invention can further reflect the light beam running out of the light guide plate from the first optical microstructure to the light emitting surface, so as to enable the light beam to exit in a desired light exiting angle. In this way, the backlight module according to the embodiments of the invention may directly be used as a backlight source without being equipped with any optical film.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate, comprising:
   a light emitting surface;
   a bottom surface, opposite to the light emitting surface;
   at least one light incident surface, connecting the light emitting surface and the bottom surface; and
   a plurality of optical units, disposed on the bottom surface, wherein each of the optical units comprises:
   a first optical microstructure; and
   at least one second optical microstructure, adjacent to the first optical microstructure, wherein the first optical microstructure is disposed between the light incident surface and the second optical microstructure, and each second optical microstructure comprises:
   a first surface, inclining towards a side of the light incident surface, wherein a cross-sectional line obtained by cutting the first surface along a direction perpendicular to the light incident surface and the light emitting surface comprises a first cross-sectional line, and the first cross-sectional line is substantially a first inclined straight line; and
   a second surface, connected to the first surface and inclining away from the side of the light incident surface, wherein a cross-sectional line obtained by cutting the second surface along the direction perpendicular to the light incident surface and the light emitting surface comprises a second cross-sectional line, a first end, adjacent to the bottom surface, of the second cross-sectional line and a second end, away from the bottom surface, of the second cross-sectional line are connected to form a first reference straight line, an acute angle included by the first reference straight line and a normal line of the light emitting surface is $\alpha$, and $\alpha$ satisfies an equation below:

$$\frac{\left[90°+\sin^{-1}\left(\frac{\sin\psi}{n}\right)\right]}{2}-15° \leq \alpha \leq \frac{\left[90°+\sin^{-1}\left(\frac{\sin\psi}{n}\right)\right]}{2}+15°$$

wherein $\psi$ is a desired angle included by an exiting light beam and the normal line of the light emitting surface, n is an index of refraction of the light guide plate, and the first surface of the second optical microstructure is between the first optical microstructure and the second surface of the second optical microstructure.

2. The light guide plate according to claim 1, wherein the first optical microstructure of each optical unit comprises:
   a first surface, inclining towards the side of the light incident surface, wherein a cross-sectional line obtained by cutting the first surface of the first optical microstructure along the direction perpendicular to the light incident surface and the light emitting surface comprises a third cross-sectional line, and the third cross-sectional line is substantially a part of a first parabolic curve; and
   a second surface, connected to the first surface of the first optical microstructure and inclining away from the side of the light incident surface, wherein the first surface of the first optical microstructure is between the light incident surface and the second surface of the first optical microstructure.

3. The light guide plate according to claim 2, wherein a cross-sectional line obtained by cutting the second surface of the first optical microstructure along the direction perpendicular to the light incident surface and the light emitting surface is an inclined straight line inclined relative to the bottom surface.

4. The light guide plate according to claim 2, wherein the first optical microstructure further comprises a first connecting surface connecting the first surface of the first optical microstructure and the second surface of the first optical microstructure.

5. The light guide plate according to claim 4, wherein the first connecting surface comprises at least one plane, at least one curved surface, or a combination thereof.

6. The light guide plate according to claim 2, wherein the third cross-sectional line comprises a plurality of inclined lines inclined relative to the bottom surface and interconnected, a plurality of interconnected curved lines, or a combination thereof.

7. The light guide plate according to claim 2, wherein the second optical microstructure further comprises a second connecting surface connecting the first surface of the second optical microstructure and the second surface of the second optical microstructure.

8. The light guide plate according to claim 7, wherein the second connecting surface comprises a plane.

9. The light guide plate according to claim 2, wherein the first parabolic curve comprises a focus, a vertex, and a symmetry axis, and a distance c from the vertex to the focus satisfies at least one of the following two equations:

$$4c \cdot (\cot\theta_{MIN} - \cot\theta_{MAX}) = D$$

$$4c \cdot [(\cot\theta_{MIN})^2 - (\cot\theta_{MAX})^2] = L$$

wherein the first parabolic curve intersects the bottom surface at a third end, the first parabolic curve intersects the second surface of the first optical microstructure at a fourth end, a distance between the third end and the fourth end in a direction parallel to the bottom surface is L, a distance between the third end and the fourth end in a direction perpendicular to the bottom surface is D, the third end and the focus of the first parabolic curve are connected to form a second reference line, the fourth end and the focus of the first parabolic curve are connected to form a third reference line, an angle included by the second reference line and the symmetry axis of the first parabolic curve is $\theta_{MAX}$, and an angle included by the third reference line and the symmetry axis of the first parabolic curve is $\theta_{MIN}$.

10. The light guide plate according to claim 9, wherein the distance L between the third end and the fourth end in the direction parallel to the bottom surface is between 0 millimeter and 2 millimeter, and the distance D between the third end and the fourth end in the direction perpendicular to the bottom surface is between 0 micrometer and 500 micrometer.

11. The light guide plate according to claim 2, wherein a cross-sectional line obtained by cutting the first surface of the second optical microstructure along a direction perpendicular to the light incident surface and parallel to the light emitting surface comprises a fourth cross-sectional line, the fourth cross-sectional line is a straight line, a cross-sectional line obtained by cutting the second surface of the second optical microstructure along the direction perpendicular to the light incident surface and parallel to the light emitting surface comprises a fifth cross-sectional line, the fifth cross-sectional line is a straight line, a cross-sectional line obtained by cutting the first surface of the first optical microstructure along the direction perpendicular to the light incident surface and parallel to the light emitting surface comprises a sixth cross-sectional line, the sixth cross-sectional line is a straight line, a cross-sectional line obtained by cutting the second surface of the first optical microstructure along the direction perpendicular to the light incident surface and parallel to the light emitting surface comprises a seventh cross-sectional line, the seventh cross-sectional line is a straight line, and the fourth cross-sectional line, the fifth cross-sectional line, the sixth cross-sectional line, and the seventh cross-sectional line are substantially parallel to each other.

12. The light guide plate according to claim 2, wherein a distance from a boundary between the first surface of the second optical microstructure and the bottom surface to a boundary between the second surface the second optical microstructure and the bottom surface decreases from a center of the second optical microstructure to two sides of the second optical microstructure, and a distance from a boundary between the first surface of the first optical microstructure and the bottom surface to a boundary between the second surface of the first optical microstructure and the bottom surface decreases from a center of the first optical microstructure to two sides of the first optical microstructure.

13. The light guide plate according to claim 2, wherein a cross-sectional line obtained by cutting the first surface of the second optical microstructure along a direction perpendicular to the light incident surface and parallel to the light emitting surface comprises a fourth cross-sectional line, the fourth cross-sectional line is a straight line or a first arc line, a cross-sectional line obtained by cutting the second surface of the second optical microstructure along the direction perpendicular to the light incident surface and parallel to the light emitting surface comprises a fifth cross-sectional line, the fifth cross-sectional line is a second arc line, the concavity of the second arc line faces the light incident surface, a cross-sectional line obtained by cutting the first surface of the first optical microstructure along the direction perpendicular to the light incident surface and parallel to the light emitting surface comprises a sixth cross-sectional line, the sixth cross-sectional line is a third arc line, the concavity of the third arc line is away from the light incident surface, a cross-sectional line obtained by cutting the second surface of the first optical microstructure along the direction perpendicular to the light incident surface and parallel to the light emitting surface comprises a seventh cross-sectional line, and the seventh cross-sectional line is a straight line or a fourth arc line.

14. The light guide plate according to claim 2, wherein at least one light incident surface is a first light incident surface and a second light incident surface opposite to each other, the optical units comprise a plurality of first optical units and a plurality of second optical units, each of the first optical units and second optical units comprises the first optical microstructure and at least one second optical microstructure, the first surface of the second optical microstructure of each of the first optical units inclines towards a side of the first light incident surface, the second surface of the second optical microstructure of each of the first optical units inclines away from the side of the first light incident surface, the first surface of the first optical microstructure of each of the first optical units inclines towards the side of the first light incident surface, the second surface of the first optical microstructure of each of the first optical units inclines away from the side of the first light incident surface, the first surface of the second optical microstructure of each of the second optical units inclines towards a side of the second light incident surface, the second surface of the second optical microstructure of each of the second optical units inclines away from the side of the second light incident surface, the first surface of the first optical microstructure of each of the second optical units inclines towards the side of the second light incident surface, and the second surface of the first optical microstructure of each of the second optical units inclines away from the side of the second light incident surface.

15. The light guide plate according to claim 14, wherein the first surface of the second optical microstructure of each of the first optical units and the first surface of the second optical microstructure of corresponding one of the second optical units are connected to form a first ring-shaped surface, the second surface of the second optical microstructure of each of the first optical units and the second surface of the second optical microstructure of corresponding one of the second optical units are connected to form a second ring-shaped surface, the first surface of the first optical microstructure of each of the first optical units and the first surface of the first optical microstructure of corresponding one of the second optical units are connected to form a third ring-shaped surface, the second surface of the first optical microstructure of each of the first optical units and the second surface of the first optical microstructure of corresponding one of the second optical units are connected to form a fourth ring-shaped surface, the third ring-shaped surface surrounds the fourth ring-shaped surface, the fourth ring-shaped surface surrounds the first ring-shaped surface, and the first ring-shaped surface surrounds the second ring-shaped surface.

16. The light guide plate according to claim 2, wherein a cross-sectional line obtained by cutting the first surface of the second optical microstructure along a direction parallel to the light incident surface and perpendicular to the light emitting surface comprises a fourth cross-sectional line, the fourth cross-sectional line is a first arc line, a cross-sectional line obtained by cutting the second surface of the second optical microstructure along the direction parallel to the light incident surface and perpendicular to the light emitting surface comprises a fifth cross-sectional line, the fifth cross-sectional line is a second arc line, a cross-sectional line obtained by cutting the first surface of the first optical microstructure along the direction parallel to the light incident surface and perpendicular to the light emitting surface comprises a sixth cross-sectional line, the sixth cross-sectional line is a third arc line, a cross-sectional line obtained by cutting the second surface of the first optical microstructure along the direction parallel to the light incident surface and perpendicular to the light emitting surface comprises a seventh cross-sectional line, the seventh cross-sectional line is a fourth arc line, and each concavity of the first arc line, the second arc line, the third arc line, and the fourth arc line faces the light emitting surface.

17. The light guide plate according to claim 2, wherein a cross-sectional line obtained by cutting the first surface of the second optical microstructure along a direction perpendicular to the light incident surface and parallel to the light emitting surface comprises a fourth cross-sectional line, the fourth cross-sectional line is a first arc line, a cross-sectional line obtained by cutting the second surface of the second optical microstructure along the direction perpendicular to the light incident surface and parallel to the light emitting surface comprises a fifth cross-sectional line, the fifth cross-sectional line is a second arc line, a cross-sectional line obtained by cutting the first surface of the first optical microstructure along the direction perpendicular to the light incident surface and parallel to the light emitting surface comprises a sixth cross-sectional line, the sixth cross-sectional line is a third arc line, a cross-sectional line obtained by cutting the second surface of the first optical microstructure along the direction perpendicular to the light incident surface and parallel to the light emitting surface comprises a seventh cross-sectional line, the seventh cross-sectional line is a fourth arc line, a radius of curvature of the third arc line is greater than a radius of curvature of the fourth arc line, the radius of curvature of the fourth arc line is greater than a radius of curvature of the first arc line, and the radius of curvature of the first arc line is greater than a radius of curvature of the second arc line, and the first arc line, the second arc line, the third arc line, and the fourth arc line are concentric.

18. The light guide plate according to claim 1, wherein an acute angle included by the first cross-sectional line and the normal line of the light emitting surface is $\beta$, and $0° \leq \beta \leq 25°$.

19. The light guide plate according to claim 1, wherein the first surface is substantially an inclined plane inclined relative to the light emitting surface.

20. The light guide plate according to claim 1, wherein the second cross-sectional line is a part of a parabolic curve or a circular arc.

21. The light guide plate according to claim 1, wherein each of the optical units is a protruding point, a bar-shaped rib extending along a direction substantially parallel to the light emitting surface, or an arc-shaped rib extending along the direction substantially parallel to the light emitting surface.

22. A backlight module, comprising:
a light guide plate, wherein the light guide plate comprises:
 a light emitting surface;
 a bottom surface, opposite to the light emitting surface;
 at least one light incident surface, connecting the light emitting surface and the bottom surface; and
 a plurality of optical units, disposed on the bottom surface, wherein each of the optical units comprises:
  a first optical microstructure; and
  at least one second optical microstructure, adjacent to the first optical microstructure, wherein the first optical microstructure is disposed between the light incident surface and the second optical microstructure, and each second optical microstructure comprises:
   a first surface, inclining towards a side of the light incident surface, wherein a cross-sectional line obtained by cutting the first surface along a direction perpendicular to the light incident surface and the light emitting surface comprises a first cross-sectional line, and the first cross-sectional line is substantially a first inclined straight line; and
   a second surface, connected to the first surface and inclining away from the side of the light incident surface, wherein a cross-sectional line obtained by cutting the second surface along the direction perpendicular to the light incident surface and the light emitting surface comprises a second cross-sectional line, a first end, adjacent to the bottom surface, of the second cross-sectional line and a second end, away from the bottom surface, of the second cross-sectional line are connected to form a first reference straight line, an acute angle included by the first reference straight line and a normal line of the light emitting surface is $\alpha$, and $\alpha$ satisfies an equation below:

$$\frac{\left[90° + \sin^{-1}\left(\frac{\sin\psi}{n}\right)\right]}{2} - 15° \leq \alpha \leq \frac{\left[90° + \sin^{-1}\left(\frac{\sin\psi}{n}\right)\right]}{2} + 15°$$

wherein $\psi$ is a desired angle included by an exiting light beam and the normal line of the light emitting surface, n is an index of refraction of the light guide plate, and the first surface of the second optical microstructure is between the first optical microstructure and the second surface of the second optical microstructure; and
 at least one light-emitting element, disposed beside the light incident surface and is capable of emitting an incident light beam, wherein the incident light beam enters the light guide plate through the light incident surface, and is transmitted out of the light guide plate from the light emitting surface to form the exiting light beam.

23. The backlight module according to claim 22, wherein the first optical microstructure of each optical unit comprises:
 a first surface, inclining towards the side of the light incident surface, wherein a cross-sectional line obtained by cutting the first surface of the first optical microstructure along the direction perpendicular to the light incident surface and the light emitting surface comprises a third cross-sectional line, and the third cross-sectional line is substantially a part of a first parabolic curve; and
 a second surface, connected to the first surface of the first optical microstructure and inclining away from the side of the light incident surface, wherein the first surface of the first optical microstructure is between the light incident surface and the second surface of the first optical microstructure.

24. The backlight module according to claim 23, wherein a cross-sectional line obtained by cutting the second surface of the first optical microstructure along the direction perpendicular to the light incident surface and the light emitting surface is an inclined straight line inclined relative to the bottom surface.

25. The backlight module according to claim 23, wherein the first optical microstructure further comprises a first connecting surface connecting the first surface of the first optical microstructure and the second surface of the first optical microstructure.

26. The backlight module according to claim 25, wherein the first connecting surface comprises at least one plane, at least one curved surface, or a combination thereof.

27. The backlight module according to claim 23, wherein the third cross-sectional line comprises a plurality of inclined lines inclined relative to the bottom surface and interconnected, a plurality of interconnected curved lines, or a combination thereof.

28. The backlight module according to claim 23, wherein the second optical microstructure further comprises a second connecting surface connecting the first surface of the second optical microstructure and the second surface of the second optical microstructure.

29. The backlight module according to claim 28, wherein the second connecting surface comprises a plane.

30. The backlight module according to claim 23, wherein the first parabolic curve comprises a focus, a vertex, and a symmetry axis, and a distance c from the vertex to the focus satisfies at least one of the following two equations:

$$4c \cdot (\cot \theta_{MIN} - \cot \theta_{MAX}) = D$$

$$4c \cdot [(\cot \theta_{MIN})^2 - (\cot \theta_{MAX})^2] = L$$

wherein the first parabolic curve intersects the bottom surface at a third end, the first parabolic curve intersects the second surface of the first optical microstructure at a fourth end, a distance between the third end and the fourth end in a direction parallel to the bottom surface is L, a distance between the third end and the fourth end in a direction perpendicular to the bottom surface is D, the third end and the focus of the first parabolic curve are connected to form a second reference line, the fourth end and the focus of the first parabolic curve are connected to form a third reference line, an angle included by the second reference line and the symmetry axis of the first parabolic curve is $\theta_{MAX}$, and an angle included by the third reference line and the symmetry axis of the first parabolic curve is $\theta_{MIN}$.

31. The backlight module according to claim 30, wherein the distance L between the third end and the fourth end in the direction parallel to the bottom surface is between 0 millimeter and 2 millimeter, and the distance D between the third end and the fourth end in the direction perpendicular to the bottom surface is between 0 micrometer and 500 micrometer.

32. The backlight module according to claim 23, wherein a cross-sectional line obtained by cutting the first surface of the second optical microstructure along a direction perpendicular to the light incident surface and parallel to the light emitting surface comprises a fourth cross-sectional line, the fourth cross-sectional line is a straight line, a cross-sectional line obtained by cutting the second surface of the second optical microstructure along the direction perpendicular to the light incident surface and parallel to the light emitting surface comprises a fifth cross-sectional line, the fifth cross-sectional line is a straight line, a cross-sectional line obtained by cutting the first surface of the first optical microstructure along the direction perpendicular to the light incident surface and parallel to the light emitting surface comprises a sixth cross-sectional line, the sixth cross-sectional line is a straight line, a cross-sectional line obtained by cutting the second surface of the first optical microstructure along the direction perpendicular to the light incident surface and parallel to the light emitting surface comprises a seventh cross-sectional line, the seventh cross-sectional line is a straight line, and the fourth cross-sectional line, the fifth cross-sectional line, the sixth cross-sectional line, and the seventh cross-sectional line are substantially parallel to each other.

33. The backlight module according to claim 23, wherein a distance from a boundary between the first surface of the second optical microstructure and the bottom surface to a boundary between the second surface of the second optical microstructure and the bottom surface decreases from a center of the second optical microstructure to two sides of the second optical microstructure, and a distance from a boundary between the first surface of the first optical microstructure and the bottom surface to a boundary between the second surface of the first optical microstructure and the bottom surface decreases from a center of the first optical microstructure to two sides of the first optical micro structure.

34. The backlight module according to claim 23, wherein a cross-sectional line obtained by cutting the first surface of the second optical microstructure along a direction perpendicular to the light incident surface and parallel to the light emitting surface comprises a fourth cross-sectional line, the fourth cross-sectional line is a straight line or a first arc line, a cross-sectional line obtained by cutting the second surface of the second optical microstructure along the direction perpendicular to the light incident surface and parallel to the light emitting surface comprises a fifth cross-sectional line, the fifth cross-sectional line is a second arc line, the concavity of the second arc line faces the light incident surface, a cross-sectional line obtained by cutting the first surface of the first optical microstructure along the direction perpendicular to the light incident surface and parallel to the light emitting surface comprises a sixth cross-sectional line, the sixth cross-sectional line is a third arc line, the concavity of the third arc line is away from the light incident surface, a cross-sectional line obtained by cutting the second surface of the first optical microstructure along the direction perpendicular to the light incident surface and parallel to the light emitting surface comprises a seventh cross-sectional line, and the seventh cross-sectional line is a straight line or a fourth arc line.

35. The backlight module according to claim 23, wherein at least one light incident surface is a first light incident surface and a second light incident surface opposite to each other, the at least one light-emitting element is two light-emitting elements disposed beside the first light incident surface and the second light incident surface respectively, the optical units comprise a plurality of first optical units and a plurality of second optical units, each of the first optical units and second optical units comprises the first optical microstructure and at least one second optical microstructure, the first surface of the second optical microstructure of each of the first optical units inclines towards a side of the first light incident surface, the second surface of the second optical microstructure of each of the first optical units inclines away from the side of the first light incident surface, the first surface of the first optical microstructure of each of the first optical units inclines towards the side of the first light incident surface, the second surface of the first optical microstructure of each of the first optical units inclines away from the side of the first light incident surface, the first surface of the second optical microstructure of each of the second optical units inclines towards a side of the second light incident surface, the second surface of the second optical microstructure of each of the second optical units inclines away from the side of the second light incident surface, the first surface of the first optical microstructure of each of the second optical units inclines towards the side of the second light incident surface, and the second surface of the first optical microstructure of each of the second optical units inclines away from the side of the second light incident surface.

36. The backlight module according to claim 35, wherein the first surface of the second optical microstructure of each of the first optical units and the first surface of the second optical microstructure of corresponding one of the second optical units are connected to form a first ring-shaped surface, the second surface of the second optical microstructure of each of the first optical units and the second surface of the second optical microstructure of corresponding one of the second optical units are connected to form a second ring-shaped surface, the first surface of the first optical microstructure of each of the first optical units and the first surface of the first optical microstructure of corresponding one of the second optical units are connected to form a third ring-shaped surface, the second surface of the first optical microstructure of each of the first optical units and the second surface of the first optical microstructure of corresponding one of the second optical units are connected to form a fourth ring-shaped surface, the third ring-shaped surface surrounds the fourth ring-shaped surface, the fourth ring-shaped surface surrounds the first ring-shaped surface, and the first ring-shaped surface surrounds the second ring-shaped surface.

37. The backlight module according to claim 23, wherein a cross-sectional line obtained by cutting the first surface of the second optical microstructure along a direction parallel to the light incident surface and perpendicular to the light emitting surface comprises a fourth cross-sectional line, the fourth cross-sectional line is a first arc line, a cross-sectional line obtained by cutting the second surface of the second optical microstructure along the direction parallel to the light incident surface and perpendicular to the light emitting surface comprises a fifth cross-sectional line, the fifth cross-sectional line is a second arc line, a cross-sectional line obtained by cutting the first surface of the first optical microstructure along the direction parallel to the light incident surface and perpendicular to the light emitting surface comprises a sixth cross-sectional line, the sixth cross-sectional line is a third arc line, a cross-sectional line obtained by cutting the second surface of the first optical microstructure along the direction parallel to the light incident surface and perpendicular to the light emitting surface comprises a seventh cross-sectional line, the seventh cross-sectional line is a fourth arc line, and each concavity of the first arc line, the second arc line, the third arc line, and the fourth arc line faces the light emitting surface.

38. The backlight module according to claim 23, wherein a cross-sectional line obtained by cutting the first surface of the second optical microstructure along a direction perpendicular to the light incident surface and parallel to the light emitting surface comprises a fourth cross-sectional line, the fourth cross-sectional line is a first arc line, a cross-sectional line obtained by cutting the second surface of the second optical microstructure along a direction perpendicular to the light incident surface and parallel to the light emitting surface comprises a fifth cross-sectional line, the fifth cross-sectional line is a second arc line, a radius of curvature of the first arc line is greater than a radius of curvature of the second arc line, and the first arc line and the second arc line are concentric.

39. The backlight module according to claim 23, wherein a cross-sectional line obtained by cutting the first surface of the second optical microstructure along a direction perpendicular to the light incident surface and parallel to the light emitting surface comprises a fourth cross-sectional line, the fourth cross-sectional line is a first arc line, a cross-sectional line obtained by cutting the second surface of the second optical microstructure along the direction perpendicular to the light incident surface and parallel to the light emitting surface comprises a fifth cross-sectional line, the fifth cross-sectional line is a second arc line, a cross-sectional line obtained by cutting the first surface of the first optical microstructure along the direction perpendicular to the light incident surface and parallel to the light emitting surface comprises a sixth cross-sectional line, the sixth cross-sectional line is a third arc line, a cross-sectional line obtained by cutting the second surface of the first optical microstructure along the direction perpendicular to the light incident surface and parallel to the light emitting surface comprises a seventh cross-sectional line, the seventh cross-sectional line is a fourth arc line, a radius of curvature of the third arc line is greater than a radius of curvature of the fourth arc line, the radius of curvature of the fourth arc line is greater than a radius of curvature of the first arc line, and the radius of curvature of the first arc line is greater than a radius of curvature of the second arc line, and the first arc line, the second arc line, the third arc line, and the fourth arc line are concentric.

40. The backlight module according to claim 22, wherein an acute angle included by the first cross-sectional line and the normal line of the light emitting surface is $\beta$, and $0°\leq\beta\leq25°$.

41. The backlight module according to claim 22, wherein the first surface is substantially an inclined plane inclined relative to the light emitting surface.

42. The backlight module according to claim 22, wherein the second cross-sectional line is a part of a parabolic curve or a circular arc.

43. The backlight module according to claim 22, wherein each of the optical units is a protruding point, a bar-shaped rib extending along a direction substantially parallel to the light emitting surface, or an arc-shaped rib extending along a direction substantially parallel to the light emitting surface.

* * * * *